US012568397B2

(12) United States Patent
Prasad et al.

(10) Patent No.: US 12,568,397 B2
(45) Date of Patent: Mar. 3, 2026

(54) SYSTEMS AND METHODS FOR GENERATING SYNTHETIC DATA PACKETS

(71) Applicant: NetScout Systems, Inc., Westford, MA (US)

(72) Inventors: Sandeep Prasad, San Jose, CA (US); Abhishek Saraswati, San Jose, CA (US); John Curtin, Allen, TX (US); Yu Wang, Allen, TX (US); Rajeev Nadkarni, Westford, MA (US); Bruce Kelley, Westford, MA (US); Tauras Liubinskas, Lexington, KY (US)

(73) Assignee: NetScout Systems, Inc., Westford, MA (US)

( * ) Notice: Subject to any disclaimer, the term of this patent is extended or adjusted under 35 U.S.C. 154(b) by 396 days.

(21) Appl. No.: 18/172,556

(22) Filed: Feb. 22, 2023

(65) Prior Publication Data

US 2024/0276295 A1 Aug. 15, 2024

Related U.S. Application Data

(60) Provisional application No. 63/444,342, filed on Feb. 9, 2023.

(51) Int. Cl.
*H04W 28/06* (2009.01)
*H04L 69/22* (2022.01)

(52) U.S. Cl.
CPC .......... *H04W 28/065* (2013.01); *H04L 69/22* (2013.01)

(58) Field of Classification Search
CPC ... H04W 28/065; H04W 24/08; H04W 24/10; H04W 4/18; H04W 24/04; H04L 69/22; H04L 43/026; H04L 43/12; H04L 41/14; H04L 67/565; H04L 43/18
See application file for complete search history.

(56) References Cited

U.S. PATENT DOCUMENTS

| | | | |
|---|---|---|---|
| 12,199,813 B2 * | 1/2025 | Gupta ................. | H04L 41/0631 |
| 2005/0203828 A1 | 9/2005 | Lyakovetsky | |
| 2012/0159151 A1 | 6/2012 | Janakiraman et al. | |
| 2016/0021188 A1 * | 1/2016 | Tapia .................. | G06F 11/3006 709/201 |
| 2016/0127514 A1 | 5/2016 | Maksumov et al. | |
| 2019/0384304 A1 | 12/2019 | Towal et al. | |
| 2020/0145852 A1 * | 5/2020 | Ayala .................... | H04W 24/08 |
| 2021/0014733 A1 * | 1/2021 | Soliman ................ | H04M 15/64 |
| 2022/0166664 A1 * | 5/2022 | Li ........................... | H04L 41/28 |

(Continued)

FOREIGN PATENT DOCUMENTS

| | | | | |
|---|---|---|---|---|
| CN | 101567845 B | 10/2009 | | |
| WO | WO-2024110773 A1 * | 5/2024 | ......... | H04L 41/0604 |

OTHER PUBLICATIONS

EP Extended Search Report dated Jun. 6, 2024 in European Patent Application No. 24156610.8.

(Continued)

*Primary Examiner* — Schquita D Goodwin

(74) *Attorney, Agent, or Firm* — Foley & Lardner LLP

(57) ABSTRACT

A method is disclosed. A first data packet is received. Data is extracted from the first data packet. A first synthetic data packet is generated from data of the first data packet. A second data packet is received. Data is extracted from the second data packet. A key performance indicator is generated from data of the first and second synthetic data packets.

18 Claims, 9 Drawing Sheets

(56)          References Cited

U.S. PATENT DOCUMENTS

| 2022/0182320 A1* | 6/2022 | Pei | ........................... | H04L 45/74 |
| 2023/0118253 A1* | 4/2023 | Murgai | ................ | H04L 41/149 |
| | | | | 370/318 |
| 2023/0217273 A1* | 7/2023 | Viswambharan | ..... | H04W 12/61 |
| | | | | 370/242 |
| 2023/0231805 A1* | 7/2023 | Peng | .................... | H04L 45/741 |
| | | | | 709/238 |
| 2023/0367833 A1* | 11/2023 | Kol | ....................... | G06F 16/958 |
| 2024/0080393 A1* | 3/2024 | Durán Alcaide | ... | H04M 3/2281 |
| 2024/0259879 A1* | 8/2024 | Ranganath | .............. | G06N 5/01 |
| 2025/0097123 A1* | 3/2025 | Mukati | .................. | G06F 11/36 |

OTHER PUBLICATIONS

AU Examination Report No. 1 on Australian Application No.
2024200824, dated Oct. 1, 2024.
CA Office Action dated Aug. 29, 2025 in Canadian Patent Application No. 3,228,569.

* cited by examiner

300

302

HTTP2 HEADERS frame (type=0x01)

304

HTTP2 Headers Block

306

HTTP2 DATA frame (type=0x01)

308

HTTP2 Data Block

302

304

306

SYSTEMS AND METHODS FOR GENERATING SYNTHETIC DATA PACKETS

CROSS-REFERENCE TO RELATED APPLICATIONS

This application claims the benefit of priority to U.S. Provisional Application No. 63/444,342, filed Feb. 9, 2023, the entirety of which is incorporated by reference herein.

BACKGROUND 5G system architecture may facilitate service-based interaction between control plane network functions (NF). Network functions within the 5GC control plane may use service-based interfaces for their interactions. Such service-based interfaces may utilize a hypertext transfer protocol/2 (HTTP/2 protocol) as an application layer serialization protocol. The HTTP/2 protocol may implement HPACK for compression and encoding of header field values.

An analytics platform can receive a 5G feed from various network service providers in a cloud-native environment or via a top-of-rack network tap. The received data can be presented in a format specific to the network service providers from which the data packets were received.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
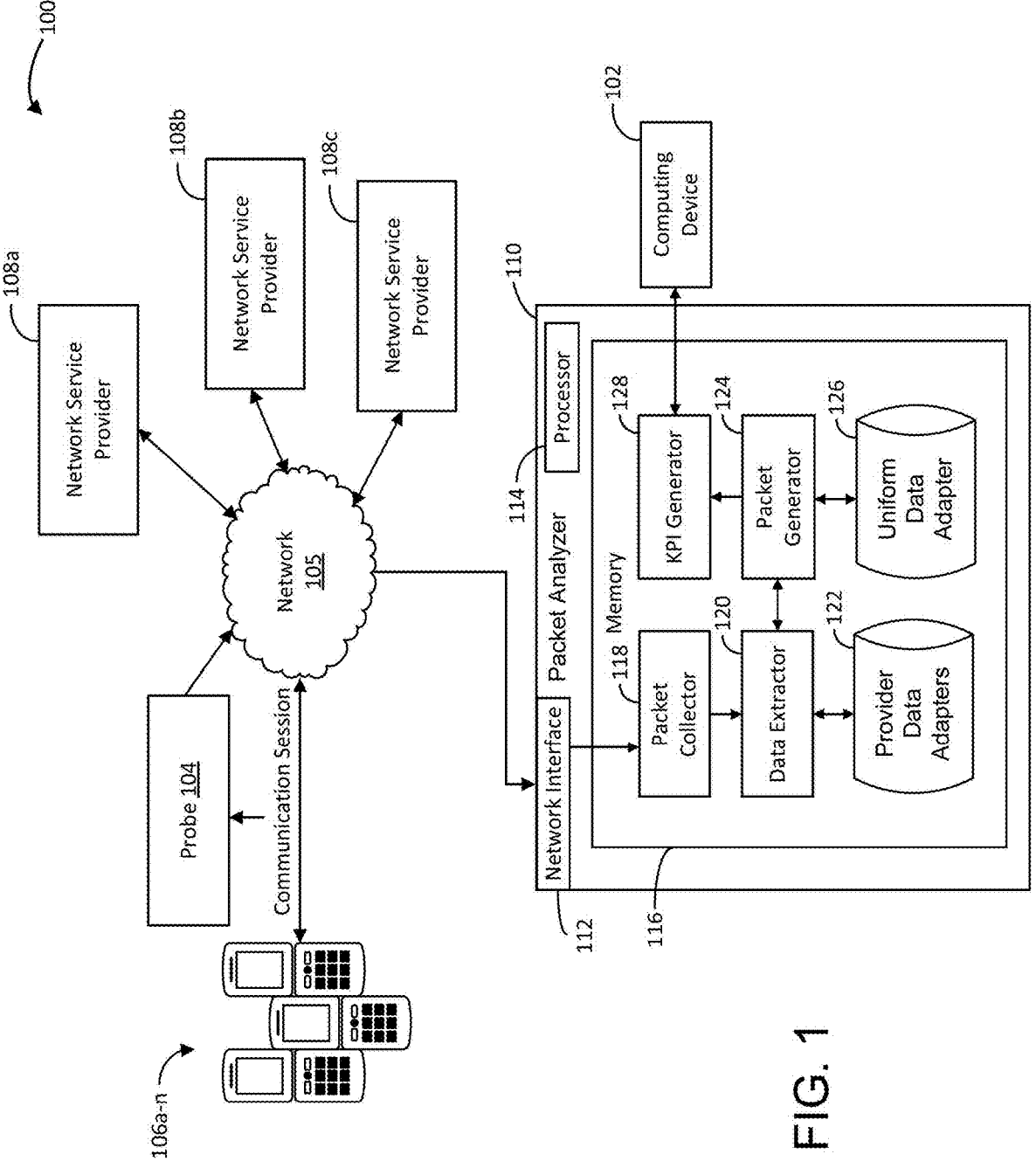
FIG. 1 is an illustration of a system for synthetic data packet generation, in accordance with an implementation.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

An analytics system may have difficulties analyzing data packets received by different network service providers (e.g., entities that manage or store network nodes (e.g., cell towers) of a 5G network). The analytics system can monitor communication sessions of a 5G network using a network probe. The analytics system can also receive data packets from different network service providers that the network service providers collect from communication sessions between user equipment (UE). While data packets that the analytics system receives by monitoring communication sessions using a network probe can be Request for Comments (RFC) and/or 3rd Generation Partnership Project (3GPP)-compliant, the data packets that the analytics system receives from the network service providers may not follow the same format and may differ between different network service providers. The network service providers may also provide different types of data in the data packets that the network service providers provide to the analytics system. In one example, network service providers may not provide data packets in the same sequence that the data packets were received or may batch data packets without an order to the data packets. Because of the variations in format and data between the monitored data packets and the data packets that the analytics system receives from network service providers, the analytics system may not be able to accurately analyze the data packets to determine key performance indicators (KPIs). In some cases, the analytics server may not be able to determine meaningful KPIs from such data at all.

A computer implementing the systems and methods described herein may overcome the aforementioned technical deficiencies. For example, a computer can store one or more network service provider-specific data adapters. Each of the data adapters can be configured to decrypt and/or extract data from data packets received from a specific or particular network service provider (e.g., data packets in a format or configuration specific to the network service provider). The computer can receive data packets from the network service providers, identify the network service providers that provided the data packets, and retrieve the data adapters that correspond to the identified network service providers. The computer can input the data packets into the data adapters that correspond to the network service providers from which the data packets were received. The computer can execute the data adapters to extract sets of data from the respective data packets. The computer can create synthetic data packets (e.g., data packets that are RFC and/or 3GPP-compliant) from the respective extracted sets of data. The computer can then analyze the data in the synthetic data packets to generate one or more KPIs and/or alerts. The computer can analyze the data in the synthetic data packets because each synthetic data packet is in a common RFC and/or 3GPP-compliant format. Thus, the computer can generate KPIs and/or alerts for communication sessions facilitated by different network service providers regardless of the format of the data packets the network service providers provide to the computer.

FIG. 1 illustrates an example system 100 for synthetic data packet generation, in some embodiments. The system 100 may enable a computer to analyze data packets (e.g., network data packets or Adaptive Service Intelligence (ASI) data packets) of network communication sessions from different network service providers. In brief overview, the system 100 can include a probe 104 that receives and/or stores data packets transmitted via a network 105 between client devices 106a-n (hereinafter client device 106 or client devices 106) and network service providers 108a-n (hereinafter network service provider 108 or network service providers 108). The network service providers 108 can each include a set of one or more servers 602, depicted in FIG. 6A, or a data center 608. The system 100 can also include a packet analyzer 110 that can communicate or interface with the probe 104 and/or the network service providers 108, either directly or via the network 105, to generate synthetic data packets. The packet analyzer 110 can generate KPIs regarding communication sessions between client devices 106 and network service providers 108 from the synthetic data packets. The packet analyzer 110 can collect data packets from the network service providers 108 and generate synthetic data packets in an RFC or 3GPP-compliant format from the collected data packets. The packet analyzer 110 can analyze the data from the synthetic data packets or transmit the synthetic data packets to an external computer for processing to generate KPIs from the synthetic data packets. The packet analyzer 110 can display the KPIs at the client device 102 and/or transmit the KPIs to the network service providers 108.

The probe 104, the client devices 106, the network service providers 108, the client device 102, and/or the packet analyzer 110 can include or execute on one or more processors or computing devices (e.g., the computing device 603 depicted in FIG. 6C) and/or communicate via the network 105. The network 105 can include computer networks such as the Internet, local, wide, metro, or other area networks, intranets, satellite networks, and other communication networks such as voice or data mobile telephone networks. The network 105 can be used to access information resources such as web pages, websites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can stream videos in video sessions across the network 105 using nodes of the network service providers 108. In some embodiments, the network 105 may be or include a self-organizing network that implements a machine learning model to automatically adjust connections and configurations of network elements of the network 105 to optimize network connections (e.g., minimize latency, reduce dropped calls, increase data rate, increase quality of service, etc.).

Each of the probe 104, the client devices 106, the network service providers 108, the client device 102, and/or the packet analyzer 110 can include or utilize at least one processing unit or other logic device such as programmable logic array engine, or module configured to communicate with one another or other resources or databases. The components of the probe 104, the client devices 106, the network service providers 108, the client device 102, and/or the packet analyzer 110 can be separate components or a single component. The system 100 and its components can include hardware elements, such as one or more processors, logic devices, or circuits.

Still referring to FIG. 1, and in further detail, the system 100 can include the network service providers 108. The network service providers 108 may each be or include servers or computers that operate to provide network connectivity between the client devices 106 and service providers that provide content across the network 105. The network service providers 108 may include 5G cellular towers and computers that operate to support and collect data for data packets that are transmitted through the cellular towers. The network service providers 108 can store data from such data packets in databases or in memory.

The network service providers 108 can transmit data in data packets to the packet analyzer 110 for analysis. Each network service provider 108 can transmit data in the data packets that are formatted in different ways and that include content that is unique to the respective network service providers 108. In some embodiments, each network service provider 108 can include a baseline set of data in each data packet. The baseline set of data can include data in a Transport Layer Security layer of the data packet (which can be encrypted), an original timestamp of packet arrival at the network function (NF) of the network service provider 108, a fully inflated HTTP/2 header (e.g., a header inflated using an HPACK protocol), a source and destination NF instance identification or name, a globally unique identifier for transaction matching (e.g., for matching a request to a response), a unique identifier for HTTP2 header/data fragment reassembly, an inbound or outbound direction of the transaction, a request or response direction, and/or a 3GPP interface type.

The network service providers 108 can provide connectivity for services provided by service providers (e.g., servers of service providers). The service providers can transmit or provide such services upon receiving requests for the services from any of the client devices 106. The term "service" as used herein includes the supplying or providing of information over a network, and is also referred to as a communications network service. Examples of services include 5G broadband services, any voice, data or video service provided over a network, smart-grid network, digital telephone service, cellular service, Internet protocol television (IPTV), etc.

The client devices 106 can include or execute applications to receive data from different servers through nodes (e.g., computers or cell towers) of the network service providers 108. For example, a client device 106 may execute a video application upon receiving a user input selection that causes the client device 106 to open the video application on the display. Responsive to executing the video application, a service provider associated with the video application may stream a requested video to the client device 106 in a communication session through a node of one of the network service providers 108. In another example, a client device 106 may execute a video game application. Responsive to executing the video game application, a service provider associated with the video game application may provide data for the video game application to the client device 106 through a node of one of the network service providers 108. The client devices 106 may establish communication sessions through the network service providers 108 (e.g., nodes of the network service providers 108) for any type of application or for any type of call.

The network service providers 108 can collect and/or store data or data packets of communication sessions that the network service providers 108 maintain. For example, when a client device 106 establishes a connection with a service provider through a network service provider 108, the client device 106 can exchange request and response data packets with the service provider through the connection. The network service provider 108 providing the connection can receive and forward the data packets between the client device 106 and the service provider to maintain the connection. In doing so, the network service provider 108 can copy and/or store the data packets or the data in the data packets in memory (e.g., in a data repository of the network service provider 108). The network service provider 108 can store the following data for the respective data packets in memory data in a Transport Layer Security layer of the data packet (which can be encrypted), an original timestamp of packet arrival at the network function (NF) of the network service provider 108, a fully inflated HTTP/2 header (e.g., a header inflated using an HPACK protocol), a source and destination NF instance identification or name, a globally unique identifier for transaction matching (e.g., for matching a request to a response), a unique identifier for HTTP2 header/data fragment reassembly, an inbound or outbound direction of the transaction, a request or response direction, and/or a 3GPP interface type.

The network service provider 108 can store the data in addition to the content or any other metadata of the data packets. By storing such data in memory, the data for the data packets can be analyzed to determine traffic flow and other KPIs for the communication sessions maintained by the network service provider 108.

The network service providers 108 can transmit the stored data and/or data packets to the packet analyzer 110. The network service providers 108 can transmit the data and/or data packets to the packet analyzer 110 over the network 105. In doing so, the network service provider 108 can transmit the data and/or data packets in batches of data packets. The batches can be transmitted in sequential order of receipt of the data packets or not in sequential order of receipt (e.g., pseudo-randomly). The network service providers 108 can transmit such data packets to the packet analyzer 110 at set time intervals or pseudo-randomly. In some embodiments, the network service providers 108 can transmit the data packets to the packet analyzer 110 in real time as the network service providers 108 receive the data packets. The network service providers 108 can include identifications of the network service providers 108 providing the data packets to the packet analyzer 110. The network service providers 108 can do so to indicate the network service providers 108 providing the communication sessions through which the data packets were transmitted.

A client device 106 can be located or deployed at any geographic location in the network environment depicted in FIG. 1. A client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 610 depicted in FIG. 6B). If the client device 106 is deployed in a cloud 610, the client device 106 can include or be referred to as a virtual client device or virtual machine. In the event the client device 106 is deployed in a cloud 610, the packets exchanged between the client device 106 and the network service providers 108 can still be retrieved by probe 104 from the network 105. The client device 102 may be similar to client devices 106. In some cases, the probe 104, the client devices 106, and/or the packet analyzer 110 can be deployed in the cloud 610 on the same computing host in an infrastructure 616 (described below with respect to FIG. 6).

As service providers provide or transmit data in communication sessions to client devices 106 through nodes of the network service providers 108, the probe 104 may intercept or otherwise monitor the control plane signaling data (e.g., control plane signaling data packets) or other Adaptive Service Intelligence (ASI) data of the communication sessions. The probe 104 may comprise one or more processors that are connected to a network equipment manufacture (NEM) trace port of network 105. In some embodiments, the probe 104 may collect control plane signaling data at an Evolved Packet Core interface (e.g., the S1-MME interface or the S6a interface) of the network 105. The control plane signaling data may include geographical location data (e.g., cell tower triangulation data or global positioning system data) of the client devices 106 as client devices 106 receive data and/or transmit, a cell identifier identifying the cell in which the respective client device 106 was located while transmitting or receiving the data, a device identifier (e.g., IMSI, MAC address, IP address, etc.) of the client device 106, dropped calls (e.g., disconnects from the streaming video provider), MAC PHY bandwidth, number of resource connection procedures a second, reference signals received power (RSRP), reference signal received quality (RSRQ), carrier to interference and noise ratio (CINR), handover information, timestamps indicating when the data was transmitted or received, etc. The probe 104 may receive such data and forward the data to the packet analyzer 110 over the network 105 for further processing.

Packet analyzer 110 may comprise one or more processors that are configured to receive control plane signaling data from the probe 104 and/or the network service providers 108, generate synthetic data packets from the data packets, and generate KPI data from the received control plane signaling data. The packet analyzer 110 may comprise a network interface 112, a processor 114, and/or memory 116. The packet analyzer 110 may communicate with any of the client device 102, the probe 104, the client devices 106, and/or the network service providers 108 via the network interface 112. The processor 114 may be or include an ASIC, one or more FPGAs, a DSP, circuits containing one or more processing components, circuitry for supporting a microprocessor, a group of processing components, or other suitable electronic processing components. In some embodiments, the processor 114 may execute computer code or modules (e.g., executable code, object code, source code, script code, machine code, etc.) stored in the memory 116 to facilitate the operations described herein. The memory 116 may be any volatile or non-volatile computer-readable storage medium capable of storing data or computer code.

Memory 116 may include a packet collector 118, a data extractor 120, a database 122 of provider data adapters, a packet generator 124, a database 126 for a uniform data adapter, and a KPI generator 128, in some embodiments. In brief overview, the components 118-128 may collect data from different network service providers 108 and generate synthetic data packets from the collected data. The components 118-128 can use network service provider-specific data adapters to extract data from the different data packets and use a uniform data adapter to generate synthetic data packets in an RFC or 3GPP-compliant format. The components 118-128 can analyze the data in the synthetic data packets to determine KPIs or transmit the data to external computing devices for downstream processing. In some embodiments, the components 118-128 may transmit the KPIs to the client device 102 in response to a request from the client device 102.

The packet collector 118 may comprise programmable instructions that, upon execution, cause the processor 114 to receive or collect data from the network service providers 108. The packet collector 118 may collect control plane signaling data from the network service providers 108. The packet collector 118 may collect data by polling or receiving data from the network service providers 108 via the network interface 112. The packet collector 118 may poll or receive data from the network service providers 108 at set intervals or pseudo-randomly. In some embodiments, the network service providers 108 may transmit the data to the packet collector 118 without a request from the packet analyzer 110. Upon receiving such data, the packet collector 118 may transmit the data to the data extractor 120.

In some embodiments, the packet collector 118 may receive or collect data from the probe 104. The packet collector 118 may collect control plane signaling data from the probe 104. The packet collector 118 may collect data by polling or receiving data from the probe 104. The packet collector 118 may poll or receive data from the probe 104 at set intervals or pseudo-randomly. Upon receiving such data, the packet collector 118 may transmit the data to the KPI generator 128.

The packet collector 118 may store data packets and/or content of the data packets that the packet collector 118 receives from the probe 104 in memory (e.g., the memory 116). The packet collector 118 may extract all data or specific data (e.g., data the packet collector 118 identifies in the data packets according to a set of rules) from each data packet and store the extracted data in the memory 116. In some embodiments, the packet collector 118 stores the entire data packets in a database in memory. The packet collector 118 may store such data packets from multiple communication sessions between different nodes. In doing so, the packet collector 118 may store identifiers (e.g., strings) of nodes involved in the communication session with the respective data packets and/or for the communication sessions themselves. The KPI generator 128 may retrieve the data packets and/or the data extracted from the data packets from the memory. The KPI generator 128 may do so to generate KPIs and/or alerts from the data on a per-communication session or device (e.g., based on the stored identifiers associated with the communications and/or devices in the data) basis and/or based on an aggregation of data across multiple communication sessions.

The data extractor 120 may comprise programmable instructions that, upon execution, cause the processor 114 to extract data from the data packets that the packet collector 118 receives or collects from network service providers 108. The data extractor 120 can extract (e.g., identify) data from the data packets using network service provider-specific data adapters each configured to extract data from data packets the packet collector 118 collected from network service providers 108 specific to the individual data adapters.

For example, responsive to the packet collector 118 receiving a data packet from a first computing device of a network service provider 108, the data extractor 120 can retrieve a data adapter (e.g., a first data adapter) that corresponds to the network service provider 108 from the database 122. The data adapter can correspond to the network service provider 108 because the data adapter can be configured to retrieve data from data packets that are formatted in a manner specific to the network service provider 108 (e.g., data packets that are in a first format). The data adapter can be or include executable code or an application programming interface (API) that the data extractor 120 or otherwise the packet analyzer 110 can execute to retrieve data from data packets collected from the network service provider 108.

The database 122 can be or include a relational database. The database 122 can be configured to store data adapters that each correspond to a different network service provider of the network service providers 108. Each data adapter can be or include a file, API, or other executable code that the data extractor 120 or packet analyzer 110 can call or retrieve to extract data from data packets received from network service providers 108 that correspond to the different data adapters. In one example, the data extractor 120 can receive one or more data packets (e.g., control plane signaling data packets or ASI data packets) from a first network service provider 108 (e.g., a first computing device of the first network service provider 108) and one or more data packets (e.g., control plane signaling data packets or ASI data packets) from a second network service provider 108 (e.g., a second data computing device of the second network service provider 108). The data extractor 120 can retrieve a first data adapter from the database 122 to extract data from the one or more data packets received from the first network service provider 108. The data extractor 120 can retrieve a second data adapter from the database 122 to extract data from the one or more data packets received from the second network service provider 108. The database 122 can store any number of data adapters each configured to extract data from a different network service provider 108.

The database 122 can store encryption keys for the data packets that the packet analyzer 110 receives from the different network service providers 108. In one example, the data or file of the different data adapters can each include or correspond to (e.g., be linked to) an encryption key that can decrypt data packets received from network service providers 108 to which the data adapters correspond. Execution of the data adapters can cause the data extractor 120 to decrypt encrypted data packets that the packet analyzer 110 receives from the different network service providers 108.

In one example, the packet collector 118 can receive one or more data packets from a first network service provider 108. Each data packet from the first network service provider 108 can be encrypted using a public or private encryption key of the first network service provider 108. The data extractor 120 can identify the first network service provider 108 as the source of the data packet from an identification of the first network service provider 108 in the one or more data packets or that packet collector 118 received with the one or more data packets. The data extractor 120 can retrieve a first data adapter from the database 122 based on the identification of the first network service provider 108. The data extractor 120 can execute the first data adapter and the first data adapter can decrypt the one or more data packets using an encryption key (e.g., a public or private encryption key) that corresponds to the first network service provider 108. The data extractor 120 can similarly retrieve and decrypt data packets that the packet collector 118 receives from a second network service provider using a second data adapter in the database 122. The data extractor 120 can similarly decrypt data packets from any number of network service providers using corresponding data adapters and encryption keys in the database 122.

The data extractor 120 can extract sets of data from the data packets the packet analyzer 110 receives from the network service provider 108. The data extractor 120 can do so using the data adapters that are specific to the network service providers 108 from which the packet collector 118 received the data packets. The data extractor 120 can do so subsequent or responsive to decrypting (e.g., via the respective data adapters) the data packets. For example, the data extractor 120 can receive one or more data packets from a first network service provider 108. The one or more data packets can be in a first format (e.g., be stored in fields or locations within the one or more data packets in a first configuration). The data extractor 120 can retrieve a data adapter that corresponds to the first network service provider 108 from the database 122. The data extractor 120 can execute the data adapter to decrypt the one or more data packets from the first network service provider 108. The data extractor 120 can execute the data adapter to cause the data adapter to query specific fields that the data adapter is configured to query. The data adapter can extract (e.g., identify) data in the specific fields to extract a set of data (e.g., a first set of data) from the one or more data packets. Upon extracting the set of data, the data adapter can store the set of data in the memory 116 (e.g., in a database or in a cache in memory). Because each data packet that the first network service provider 108 transmits to the packet analyzer 110 can include the same types of data and/or be in the same format, the data adapter for the first network service provider 108 can retrieve data from the data packets of the network service provider 108 while data adapters for other network service providers 108 may not be able to extract or retrieve such data.

The data extractor 120 can receive one or more data packets from a second network service provider 108. The one or more data packets from the second network service provider 108 can be in a second format (e.g., be stored in fields or locations within the one or more data packets in a second configuration). The second format can be different from the first format (e.g., the second format can have a different configuration and/or include different data or types of data from the first format). The data extractor 120 can retrieve a data adapter that corresponds to the second network service provider 108 from the database 122. The data extractor 120 can execute the data adapter to decrypt the one or more data packets from the second network service provider 108. The data extractor 120 can execute the data adapter to cause the data adapter to query specific fields that the data adapter is configured to query. The data adapter can extract (e.g., identify) data in the specific fields to extract a set of data (e.g., a second set of data) from the one or more data packets. Upon extracting a set of data, the data adapter can store the set of data in the memory 116 (e.g., in a database or in a cache in memory). Because each data packet that the second network service provider 108 transmits to the packet analyzer 110 can include the same types of data and/or be in the same format, the data adapter for the second network service provider 108 can retrieve data from the data packets of the network service provider 108 while data adapters for other network service providers 108 may not be able to extract or retrieve such data.

The packet generator 124 may comprise programmable instructions that, upon execution, cause the processor 114 to generate synthetic data packets from data that the data extractor 120 extracts from data packets received from the network service providers 108. Synthetic data packets can be data packets that are in a uniform format and/or that have the same types of content (e.g., that are in an RFC or 3GPP-compliant format). The uniform format can be a format different from the formats of the data packets that the packet collector 118 receives from the network service providers 108. The packet generator 124 can generate the data packets using a data adapter (e.g., a uniform data adapter) that includes rules and/or other executable code that can be executed to generate the data packets. The packet generator 124 can execute the uniform data adapter to generate data packets that are each in the same format (e.g., an RFC or 3GPP-compliant format) and/or that include the same content. The uniform data adapter can generate such data packets from the sets of data that the data extractor 120 extracts (e.g., identifies) from data packets received from network service providers 108.

The uniform data adapter can be stored in a database 126. The database 126 can be or include a relational database. The database 126 can be or include rules and/or other executable code of the uniform data adapter. The packet generator 124 can retrieve the uniform data adapter from the database 126 responsive to the data extractor 120 extracting one or more sets of data from data packets using data adapters of database 122.

By executing the uniform data adapter, the packet generator 124 can generate a synthetic data packet from a set of data the data extractor 120 extracted from a data packet via a data adapter of a network service provider. The packet generator 124 can generate the synthetic data packet to have an RFC or 3GPP-compliant format. For example, the packet generator 124 can generate the synthetic data packet to have an Ethernet layer, an Internet Protocol (IP) layer, a transmission control protocol (TCP) layer, a payload, and a header. The packet generator 124 can identify extracted data from a data packet (e.g., an extracted set of data from the data packet) that corresponds to each of the layers and/or fields of the synthetic data packet. The packet generator 124 can insert the identified data into the corresponding layers and/or fields to populate or otherwise generate the synthetic data packet.

The packet generator 124 can use the uniform data adapter to generate synthetic data packets to have the same format regardless of the network service provider 108 from which the packet collector 118 received the data packets. For example, the packet generator 124 can extract a first set of data from a data packet received from a first network service provider 108 using a first data adapter from the database 122. The packet generator 124 can extract a second set of data from a data packet received from a second network service provider 108 using a second data adapter from the database 122. The packet generator 124 can identify the data from the first set of data. The packet generator 124 can generate a first synthetic data packet organized in or otherwise having the uniform format (e.g., the RFC or 3GPP-compliant format) by inserting the identified data from the first set of data into the first synthetic data packet. The packet generator 124 can identify the data from the second set of data. The packet generator 124 can generate a second synthetic data packet organized in or otherwise having the uniform format (e.g., the RFC or 3GPP-compliant format) by inserting the identified data from the second set of data into the second synthetic data packet.

The packet generator 124 can use the uniform data adapter to generate a synthetic data packet that includes data from multiple received data packets. The packet generator 124 can generate the synthetic data packet to include data from multiple received data packets from the same network service provider 108. For example, the packet collector 118 can receive multiple data packets from a first network service provider 108. The packet collector 118 can receive the data packets in a batch or sequentially as the first network service provider 108 or generates the data packets. The data extractor 120 can use a first data adapter to extract a set or sets of data from the multiple data packets from the first network service provider 108. The packet generator 124 can identify the extracted data from the multiple data packets and insert the values from the extracted data into a single synthetic data packet. The packet generator 124 can insert sets of data from multiple data packets into a single synthetic data packet to consolidate the data packets into a single data packet, thus conserving resources in the memory 116. The packet generator 124 may consolidate the data packets into a single synthetic data packet, for example, when each of the data packets correspond to a single message from one node to another node of a communication session.

The packet generator 124 can generate a synthetic data packet from multiple data packets that each correspond to a single message. The packet generator 124 can do so by identifying data within the multiple data packets of the message. For example, the packet generator 124 can identify data packets that each have the same source node (e.g., source IP address) and the same destination node (e.g., destination IP address) from data extracted from the data packets. The packet generator 124 can generate a synthetic data packet for multiple data packets based on the multiple data packets having common source nodes and destination nodes and/or based on each data packet having a common HTTP2 stream identifier and/or a common identification that the data packet is for a request message or a response message. Based on the identification, the packet generator 124 can determine to include or insert data from the data packets into the same synthetic data packet. The packet generator 124 can identify the data packets that have sequential sequence numbers and one or more or all of the common identifiers as listed above and insert the data from the data packets into the corresponding fields of the synthetic data packets to consolidate the data from the data packets into a single synthetic data packet.

When generating a synthetic data packet from multiple data packets, the packet generator 124 can insert the payloads of each of the multiple data packets into the payload field or layer of the synthetic data packet. The packet generator 124 may insert the common identifications between the multiple data packets (e.g., the IP addresses, MAC addresses, global unique identifiers, the port numbers, etc.) into the corresponding layers of the synthetic data packet. In some embodiments, the packet generator 124 can determine a sequence number of the synthetic data packet based on the byte number of the first byte of the synthetic data packet compared to the bytes of other synthetic data packets of the same request or response. The packet generator 124 can identify the order of the synthetic data packets of a request or response based on timestamps of the synthetic data packets or the data packets for which data is stored in the synthetic data packets (e.g., order the synthetic data packets in sequential order starting at the earliest timestamp of the data packets within the synthetic data packets), aggregate the number of bytes in the preceding synthetic data packets to the synthetic data packet, and determine the sequence number to be the next number after the aggregated number of bytes. The packet generator 124 can insert the sequence number into the synthetic data packet.

The packet generator 124 can generate the synthetic data packet to include data of multiple sequences of messages. For example, a request or response from a computing device may include a message including three separate sequences of data packets. The packet generator 124 can identify the data packets (e.g., a subset of data packets) that each correspond to the same request or response based on the identification of the request or response, the sequence numbers, the identifications of the source and destination nodes, and/or the identification of the network service provider 108 that provided the data packets in the data packets. The packet generator 124 can generate a single synthetic data packet using the data from the multiple sequences to consolidate the data into a single synthetic data packet and conserve memory resources.

The packet generator 124 can consolidate the data packets of a single request or response into multiple synthetic data packets. The packet generator 124 can do so, for example, for each sequence of the request or response. For instance, the packet generator 124 can identify the data packets that each correspond to the same request or response based on the identification of the request or response, the sequence numbers, the identifications of the source and destination nodes, and/or the identification of the network service provider 108 that provided the data packets. The packet generator 124 can identify the data packets that correspond to different sequences of the request or response based on identifications of the respective sequences in the data packets. The packet generator 124 can divide the data extracted from the different data packets by the sequence of the data packets and generate a synthetic data packet for each sequence of the request. The packet generator 124 can divide the sequences into different synthetic data packets to avoid overfilling any single synthetic data packet with data and/or to avoid dividing the data of a request or response between synthetic data packets in a manner that makes the data in the synthetic data packets difficult to analyze.

For example, the packet collector 118 can receive a set of data packets from a first network service provider 108 (e.g., a first computing device of the network service provider 108). Each of the set of data packets can include an identification of a sequence of data packets to which the data packets belong. Different data packets can include identifications of different identifications of sequences, either because the network service provider 108 sent over a batch of data packets at a single time or the data packets were transmitted or received by the packet analyzer 110 or the network service provider 108 in error or unsuccessfully. The data extractor 120 can identify a set of data packets (e.g., a control plane signaling data packets) that each include or correspond to the same sequence of data packets from the network service provider 108. The data extractor 120 can extract a set of data from each of the data packets of the set of data packets. The packet generator 124 can generate a single synthetic data packet from the extracted data of each of the set of data packets of the same sequence. In this way, the packet generator 124 can generate a synthetic data packet that corresponds to a single request or response from a computing device.

In some embodiments, the packet generator 124 can include data from the same or a maximum number of data packets in each synthetic data packet for a specific network service provider 108. A database within the memory 116 can store defined numbers or values for individual network service providers 108. Each number or value within the database can have a stored association with an identification of the respective network service provider 108. The number or value can indicate a number or maximum number of data packets to include from the network service provider to include in any single synthetic data packet that the packet generator 124 generates. The packet collector 118 can receive multiple data packets and/or an identification of a network service provider 108. The packet collector 118 can identify the identification of the network service provider 108 and use the identification of the network service provider 108 to query the database of defined values. The packet generator 124 can identify a value or number that has a stored association with an identification matching the identification received from the network service provider 108. The packet generator 124 can identify data from a number of data packets received from the network service provider 108 equal to the defined number to include in each synthetic data packet that the packet generator 124 receives from the network service provider 108.

In some cases, the packet generator 124 can divide the synthetic data packets by sequence and the defined number for the network service provider 108. For example, a network service provider 108 can include multiple sequences of data packets in data packets that the network service provider 108 provides or transmits to the packet analyzer 110. The packet generator 124 can identify the number of data packets in each sequence (e.g., based on the sequence identifications of each sequence) and determine a number of sequences of data packets that can be included in a single synthetic data packet without exceeding the defined number for the network service provider 108 (and/or another defined number that the packet generator 124 can apply globally to each network service provider 108). The packet generator 124 can include data from each data packet of each sequence in a single synthetic data packet that does not exceed the number of data packets that can be included in a single synthetic data packet. The packet generator 124 can iteratively compare data packets of any number of sequences to the defined number for the network service provider 108 and/or the global defined number to generate any number of synthetic data packets from data packets provided by a single network service provider.

The packet generator 124 can include sequence numbers into a synthetic data packet. For example, the packet generator 124 can include a single synthetic data packet per data packet that the packet collector 118 receives. The packet generator 124 can identify a sequence number of the data packet as extracted by the data extractor 120. The packet generator 124 can generate a synthetic data packet from the data packet and include the sequence number of the data packet in the synthetic data packet. In some cases, the packet generator 124 can generate a synthetic data packet that includes data of multiple data packets.

The packet generator 124 can include identifications of whether data from data packets included in a synthetic data packet are for a request or for a response. The packet generator 124 can retrieve such identifications from data extracted from the data packets. The packet generator 124 can insert such identifications into HTTP2 layers of synthetic data packets. By including such identifications in synthetic data packets, the synthetic data packets may be more accurately analyzed.

The packet generator 124 can include a global unique identifier in synthetic data packets. The packet generator 124 can retrieve such identifiers from data extracted from the data packets. The packet generator 124 can insert such identifiers into HTTP2 layers or transport layers of synthetic data packets. By including such identifiers in synthetic data packets, synthetic data packets that correspond to requests (e.g., that include a request identification) can be matched with synthetic data packets that correspond to responses (e.g., that include a response identification) that have the same or an identical global unique identifier in a communication session transaction (e.g., a request/response transaction). Such can be useful for analyzing the data of the synthetic data packets.

The KPI generator 128 may comprise programmable instructions that, upon execution, cause the processor 114 to generate KPIs and/or alerts from data (e.g., the payloads and/or headers) of the data packets (e.g., the synthetic data packets generated by the packet generator 124 and/or data packets collected from the probe 104). Examples of KPIs include, but are not limited to, latency, number of connections, quality of the connections, volume of data transmitted, average connection time, cell PRB (physical resources blocks), resources consumed, etc. Other examples of KPIs may be related to connection quality such as min/max/average/mean and distribution of connection mean opinion score (MOS), connection drops, retransmissions, etc. An example of an alert may be an alert of a security breach. The KPI generator 128 may generate the KPIs or alerts for individual communication sessions, geographical areas in which individual nodes that are communicating and receiving data across the network 105 are located, types of devices, etc.

The KPI generator 128 may generate the KPIs or alerts based on data in synthetic data packets stored in the memory 116. For example, the KPI generator 128 may be or retrieve a service that is configured to generate KPIs or alerts based on data packets in the uniform format (e.g., the RFC or 3GPP-compliant format). The KPI generator 128 can retrieve other services to generate KPIs or alerts from data packets in other formats, in some embodiments. The KPI generator 128 may retrieve synthetic data packets from the memory 116. The KPI generator 128 can identify the sequences and/or other metadata regarding the data packets from the data in the different layers of the synthetic data packets. The KPI generator 128 can identify the data in the payloads of the synthetic data packets and/or any other data regarding the synthetic data packets and generate KPIs and/or alerts based on the metadata and/or the payloads of the synthetic data packets. The KPI generator 128 may be able to do so because each of the synthetic data packets can have the same format (e.g., the uniform format). The KPI generator 128 can retrieve the metadata and/or the data in the payloads of the synthetic data packets to generate KPIs or alerts from the retrieved metadata and/or data in the payloads.

The KPI generator 128 can generate KPIs or alerts based on a combination of data collected from the probe 104 and synthetic data packets generated by the packet generator 124. For example, the probe 104 can collect one or more data packets of a communication session between a first node and a second node from a communication channel between the two nodes (e.g., computing devices). Such data packets can include timestamps indicating times of transmission or receipt of the data packets, for example. The probe 104 can transmit the data to the packet collector 118. The packet collector 118 can store the collected data in the memory 116 (e.g., in a database within the memory 116). The packet generator 124 can generate a first synthetic data packet from data of one or more data packets collected from a first network service provider 108 and a second synthetic data packet from data of one or more data packets collected from a second network service provider 108 (e.g., the times of transmission or receipt of the data packets). The first and second synthetic data packets can each include a timestamp (e.g., a nanosecond timestamp) indicating a time of transmission or receipt of the data packet from a network function. The KPI generator 128 can identify such timestamps to order the synthetic data packets for accurate processing and/or to determine KPIs, such as the latency across the network (e.g., based on the differences in times of receipt and/or transmission between requests and responses). The packet generator 124 can generate any number of such synthetic data packets from data of data packets of any number of network service providers 108. Because the data packets collected by the probe 104 and the synthetic data packets may each have the same format (e.g., the RFC or the 3GPP-compliant format), the KPI generator 128 can analyze the data of the data packets (e.g., at least a portion of the data of the data packets) together to generate KPIs or alerts for the data packets transmitted by nodes over communication sessions provided by the network service providers 108. The KPI generator 128 can generate such KPIs or based on the synthetic data packets and collected data packets alone or in combination to generate views of how the network is operating.

The KPI generator 128 may export generated KPIs or alerts and/or corresponding data to the client device 102. For example, the KPI generator 128 may create an exportable file (e.g., a file with a format such as BIL, GRD/TAB, PNG, ASKII, KMZ, etc.) from the generated KPIs or alerts and transmit the exportable file to the client device 102 for display. The KPI generator 128 may transmit the exportable file to the client device 102 responsive to a request from the client device 102. In some embodiments, the KPI generator 128 may generate and/or export KPIs or alerts to the client device 102 at set intervals to provide the client device 102 with real-time updates of the performance communication sessions between nodes.

In some embodiments, the KPI generator 128 may export KPIs or alerts that the KPI generator 128 generates based on the data packets of the communication session. The KPI generator 128 may encapsulate the KPIs or alerts into data packets and transmit the data packets to the client device 102 for processing (e.g., for display at a user interface). In some embodiments, the KPI generator 128 encapsulates and/or transmits the data packets (e.g., the synthetic data packets and/or the data packets received from the probe 104) or data from the data packets to the client device 102 without generating KPIs or alerts from the data packets or data. In such embodiments, the client device may display the data and/or generate the KPIs or alerts itself.

Figure 2:
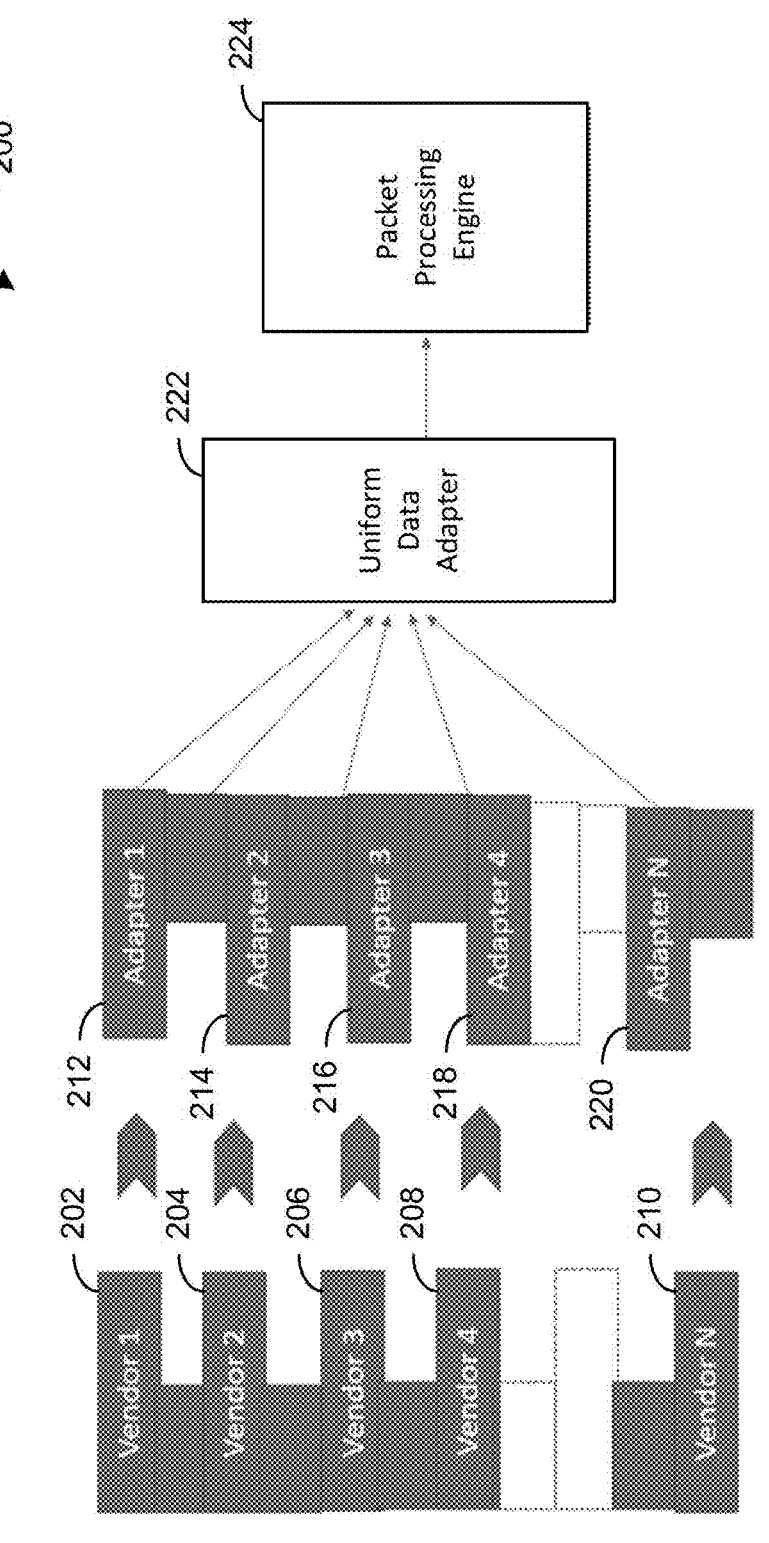
FIG. 2 is a flow diagram of a sequence for synthetic data packet generation, in accordance with an implementation.

FIG. 2 is a flow diagram of a sequence 200 for synthetic data packet generation, in accordance with an implementation. The sequence 200 can be performed by a data processing system (a client device, a probe, the packet analyzer 110, shown and described with reference to FIG. 1, a server system, etc.). The sequence 200 may include more or fewer operations and the operations may be performed in any order. The sequence 200 can be performed by any number of components.

In one example, the sequence 200 can be performed by vendors 202, 204, 206, 208, and 210, data adapters 212, 214, 216, 218, and 220, a uniform data adapter 222, and a packet processing engine 224. The vendors 202-210 can each be a network service provider similar to or the same as the network service providers 108, shown and described with reference to FIG. 1. The data adapters 212-220 can each be data adapters similar to or the same as the data adapters stored in the database 122. The uniform data adapter 222 can be a data adapter similar to or the same as the uniform data adapter stored in the database 126, shown and described with reference to FIG. 1. The packet processing engine 224 can be the same as or similar to the KPI generator 128 or a computing device outside of the packet analyzer 110, shown and described with reference to FIG. 1.

In the sequence 200, the vendors 202-210 can each transmit one or more data packets to one of the data adapters 212-220 that correspond to the respective vendors 202, 204, 206, 208, and 210. The vendors 202-210 can do so by transmitting the data packets to a data processing system that stores the respective data adapters 212-220. The data processing system can receive the data packets from the vendors 202-210 and identify and retrieve the data adapters 212-220 that correspond to the vendors 202-210 from memory. The data processing system can provide the data packets into the data adapters 212-220 that correspond to the vendors 202-210 from which the data packets were received as input. The data processing system can execute the data adapters 212-220 to extract data from the input data packets.

Responsive to extracting the data from the data packets using the data adapters 212-220, the data processing system can generate synthetic data packets from the data packets of individual vendors 202-210. For example, using only the data extracted using the data adapter 212 as input, the data processing system can execute the uniform data adapter 222 to generate one or more synthetic data packets (e.g., one or more first synthetic data packets). Using only the data extracted using the data adapter 214 as input, the data processing system can execute the uniform data adapter 222 to generate one or more synthetic data packets (e.g., one or more second synthetic data packets). The data processing system can similarly generate synthetic data packets from data extracted by the data adapters 216-220 using the uniform data adapter 222. The data processing system can similarly generate synthetic data packets using any number of data adapters on data packets received from any number of vendors. Thus, the data processing system can generate synthetic data packets for different vendors using a combination of vendor-specific data adapters and a uniform data adapter.

The packet processing engine 224 can process the synthetic data packets to generate KPIs and/or alerts. In some cases, the packet processing engine 224 can process the synthetic data packets in combination with data packets the packet processing engine 224 receives from a probe (e.g., the probe 104) monitoring communication sessions over a network. The packet processing engine 224 can apply one or more rules to the synthetic data packets and/or the received data packets from the probe to generate KPIs and/or alerts. Because each of the received data packets and the synthetic data packets can be in the same format (e.g., in an RFC or 3GPP-compliant format), the packet processing engine 224 can generate more accurate KPIs or alerts from the data packets.

Figure 3A:
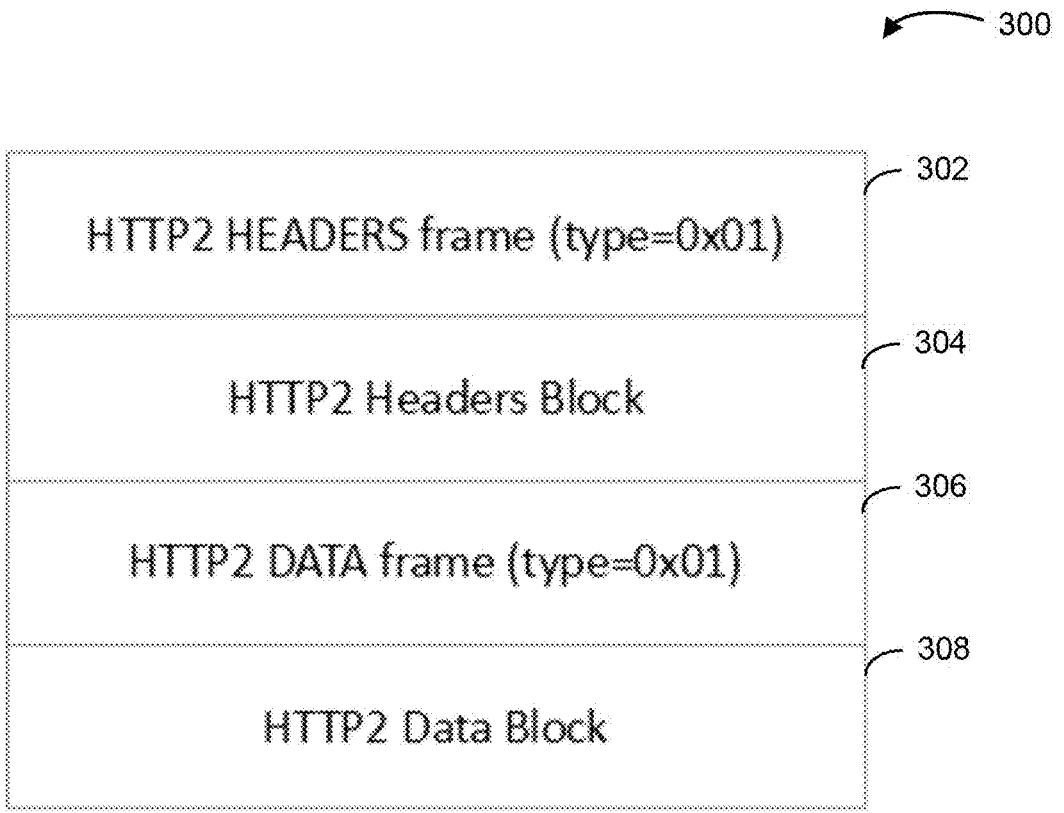
FIG. 3A is a diagram illustrating an example service-based interface (SBI) data packet, in accordance with an implementation.
Figure 3B:
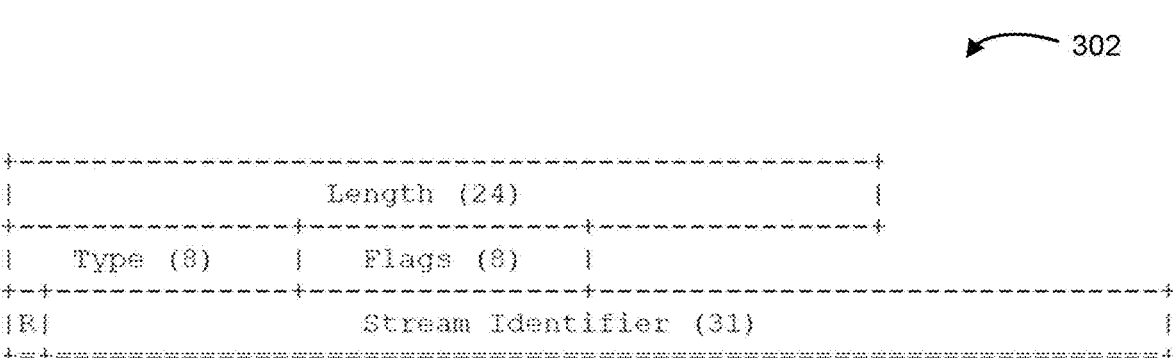
FIGS. 3B-3D are diagrams illustrating example layers of an example SBI data packet, in accordance with an implementation.
Figure 3C:
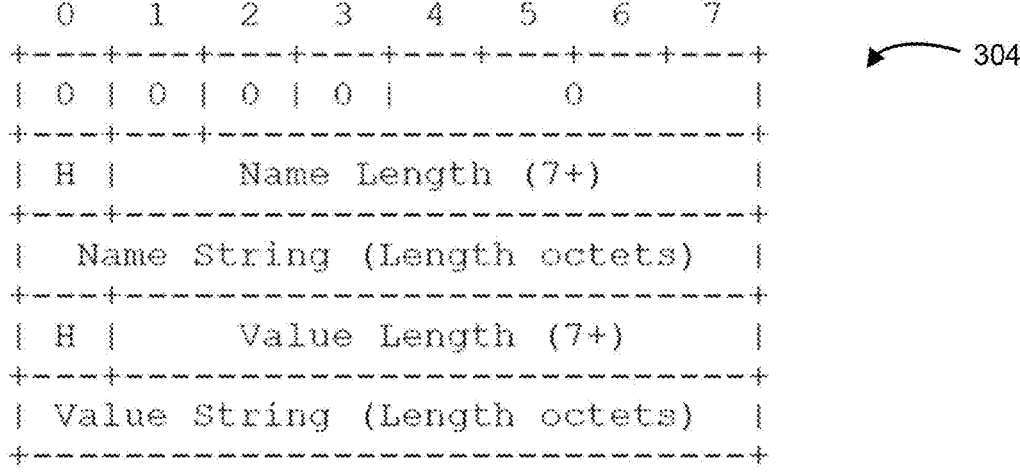
Figure 3D:
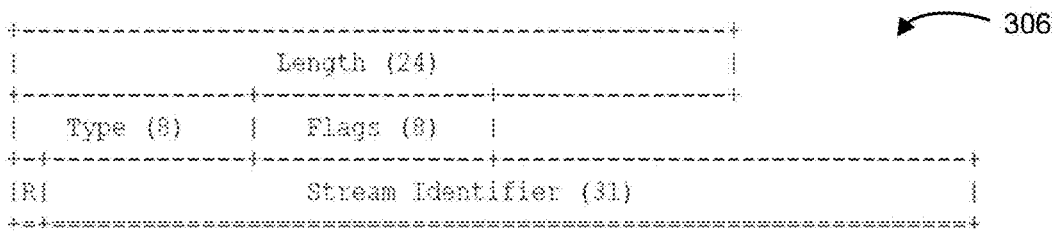

FIG. 3A is a diagram illustrating a service-based interface (SBI) data packet 300, in accordance with an implementation. The SBI data packet 300 can be an example of a data packet that the data processing system (a client device, a probe, the packet analyzer 110, shown and described with reference to FIG. 1, a server system, etc.) receives from a vendor or network service provider 108, shown and described with reference to FIG. 1. The SBI data packet 300 can include an HTTP2 headers frame layer 302, an HTTP2 headers block 304, an HTTP2 data frame 306, and an HTTP2 data block 308. Examples of the layers 302-308 of the SBI data packet 300 are illustrated in FIGS. 3B-3D.

The HTTP2 headers frame layer 302 (illustrated in FIG. 3B) can be a 9 octet header. The HTTP2 headers frame layer 302 can have a type=0x01 format. The HTTP2 headers frame layer 302 can be encoded according to an RFC 7540 section 6.2 protocol. The HTTP2 headers block 304 (illustrated in FIG. 3C) can have different fields that are each encoded according to an RFC 7541 section 6.2.2 protocol. Each field of an HTTP header field can be encoded according to an RFC 7540 section 8.1.2 protocol.

The HTTP2 data frame layer 306 (illustrated in FIG. 3D) can be a 9 octet header. The HTTP2 data frame layer 306 can have a type=0x00 format. HTTP2 data frame layer 306 can be encoded according to an RFC 7540 section 6.2 protocol. The HTTP2 data block layer 308 can include a message payload according to an RFC 7540 protocol.

Figure 4:
FIG. 4 is a diagram illustrating an example synthetic data packet, in accordance with an implementation.
Figure 4:
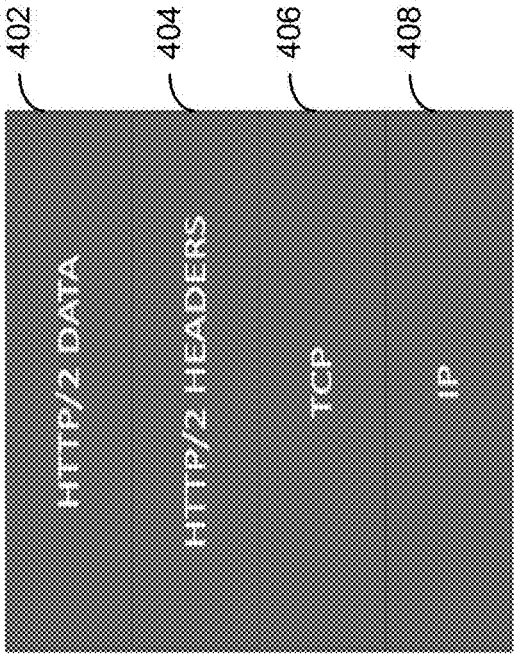

FIG. 4 is a diagram illustrating a synthetic data packet 400, in accordance with an implementation. The synthetic data packet 400 can be an example of a synthetic data packet generated by a uniform data adapter (e.g., the uniform data adapter stored in the database 126 or the uniform data adapter 222) executed by a data processing system (a client device, a probe, the packet analyzer 110, shown and described with reference to FIG. 1, a server system, etc.).

The synthetic data packet 400 can include a payload layer 402, an HTTP/2 headers layer 404, a transport layer 406, and an IP layer 408. The payload layer 402 can include the data of the synthetic data packet 400. The HTTP/2 headers layer 404 can include HTTP/2 headers in an application layer of the synthetic data packet 400. The HTTP/2 headers layer can include information such as a request uniform resource locator (URL), the type of data being transmitted, and additional parameters related to a request or a response.

The transport layer 406 can include information such as source and destination port numbers, sequence and acknowl-edgment numbers, and any flags indicating the types of transport protocol being used (e.g., TCP or user datagram protocol (UDP)). The fields of the transport layer 406 can be filled to be compliant with RFC 793 protocol. For example, the transport layer 406 of the synthetic data packet 400 can include data for a source port (e.g., a source port of an HTTP2 SBI Message (TCP Source Port)), a destination portion (e.g., a destination port of an HTTP2 SBI Message (TCP Destination Port)), and a sequence number (e.g., a TCP Sequence Number of first protocol data unit (PDU) related to an SBI message).

The IP layer 408 can include network layer information that can be used to transmit information about the network path and routing of IP packets. The IP layer 408 can include information such as the source and destination IP addresses, the synthetic packet's time to live, and information that can be used by routers to forward the synthetic data packet 400 to the destination of the synthetic data packet 400.

For example, the IP layer 408 can include an inner IP header. The inner IP header can follow an IPv4 or IPv6 header format. In the IPv4 header format, the IP layer 408 can include 20 bytes of data. Fields of the IP layer 408 can be filled according to RFC 760 protocol. The IP layer 408 can include the following data: the IPv4 source address of the original HTTP2 SBI Message, the destination address of the original HTTP2 SBI Message, and/or the unfragmented length of the message (e.g., the synthetic data packet 400). In the IPv6 header format, the IP layer 408 can include 40 bytes of data. Fields of the IP layer 408 can be filled according to RFC 2460 protocol. The IP layer 408 can include the following data: the IPv6 source address of the original HTTP2 SBI Message, the destination address of the original HTTP2 SBI Message, and/or the unfragmented length of the message (e.g., the synthetic data packet 400).

In one example, the synthetic data packet 400 can be 3GPP compliant and/or can be fed into external tools moni-toring a network (e.g., a 4G, 5G, or 6G network). The synthetic data packet 400 can include an Ethernet layer. The data processing system can generate the Ethernet layer by filling the Ethernet layer with source and destination MAC addresses.

The synthetic data packet 400 can include an IP layer. The data processing system can generate the IP layer using a names table. For example, the data processing system can store a names table that maps human-readable names, such as hostnames or domain names, to the names' corresponding IP addresses. The data processing system can generate the IP layer of the synthetic data packet identifying the network names (e.g., source name and destination name) or the human-readable names in the received data packets (which may be SBI data packets) and identifying the IP addresses (e.g., source IP addresses and destination IP addresses) that correspond to the human-readable names. The data process-ing system can insert the identified IP addresses into the IP layer of the synthetic data packet 400. The data processing system can populate the IP layer of the synthetic data packet 400 with other information, such as the protocol being used and/or the time-to-live value of the synthetic data packet. In this way, the names table can enable the data processing system to generate IP layers of synthetic data packets dynamically without the need for manual configuration of IP addresses, which can make it easier to identify network configurations and ensure the synthetic data packets are 3GPP compliant.

The synthetic data packet 400 can include a TCP layer. The data processing system can generate the TCP layer by filling the TCP layer with port numbers (e.g., a destination port and/or a source port) or a port range for the synthetic data packet 400. The port numbers or range can be assigned to the TCP layer such that the network function (e.g., the network function as the source and/or the destination of the synthetic data packet) can be identified from the port num-bers or the port range. The data processing system can also include sequencing information of the synthetic data packet in the TCP layer.

The synthetic data packet 400 can include an HTTP/2 layer. The data processing system can generate the HTTP/2 layer by inserting a stream identification (e.g., a global or globally unique identifier) for a request or response message into the HTTP/2 layer. The stream identification can indicate the stream or transaction (e.g., communication transaction, such as a request and response sequence of messages) to which the synthetic data packet 400 belongs. The data processing system can include HTTP/2 flow information and unique sequence numbers for the synthetic data packet 400 based on the data being inserted into the data packet (e.g., the PDUs of the synthetic data packet 400). The sequence numbers can conform to 3GPP specifications.

The data processing system can include the following data extracted from data packets received from vendors or net-work service providers in the synthetic data packet 400: a fully decrypted TLS layer, an original timestamp of packet arrival at the NF, a fully inflated HTTP/2 HEADERS (HPACK), source and destination NF Instance Identifica-tion/Name, a globally unique identifier for transaction matching (e.g., transaction matching during analysis), a unique identifier for HTTP2 Header/Data fragment reassem-bly, an inbound or outbound direction of the transaction, an identification of a request or response direction, and/or a 3GPP Interface Type. These identifiers can be used to map HTTP/2 flow-related data with NF and 3GPP-compliant packets for further processing.

Figure 5:
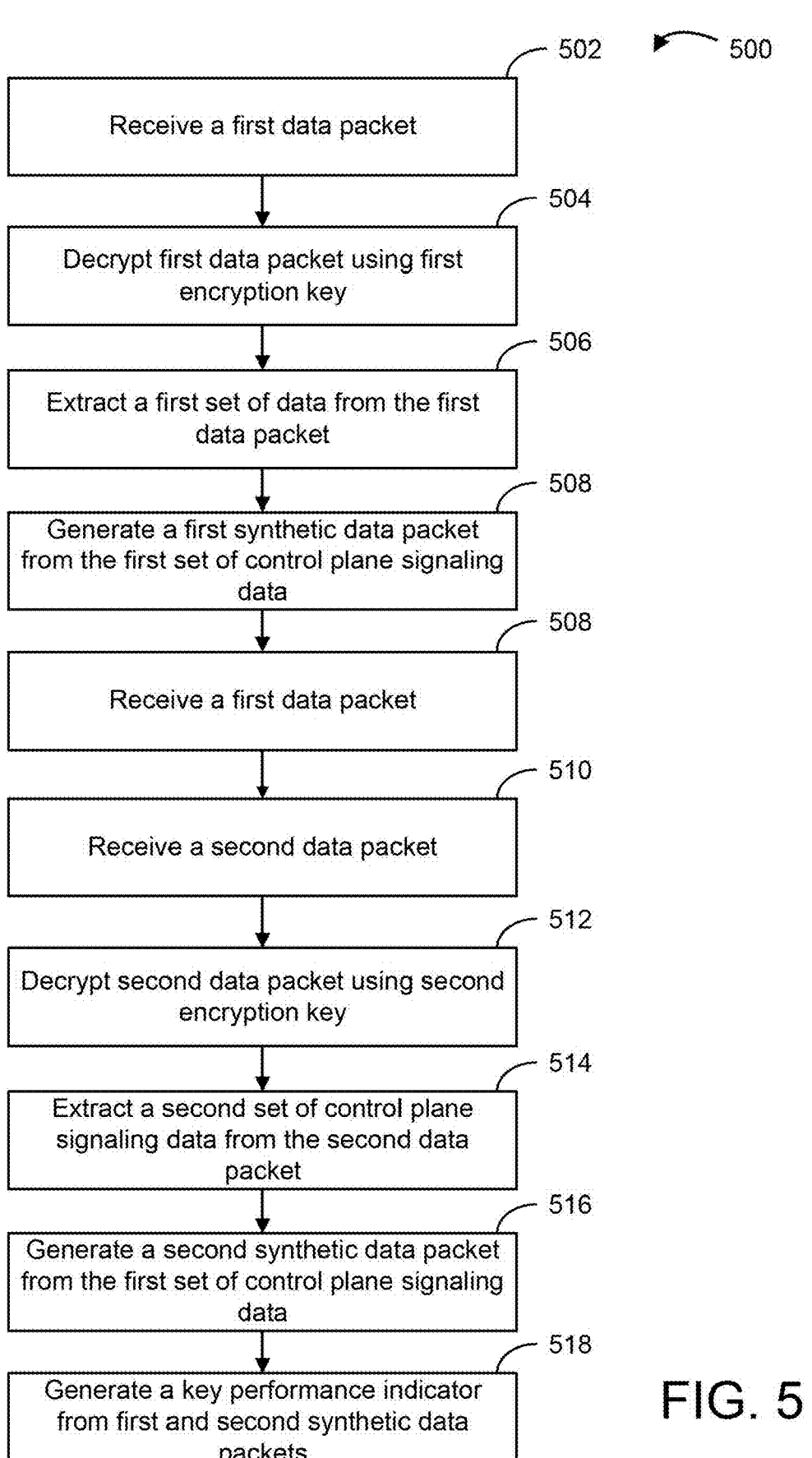
FIG. 5 is a method for synthetic data packet generation, in accordance with an implementation.

FIG. 5 is an illustration of a method 500 for synthetic data packet generation, in accordance with an implementation. The method 500 can be performed by a data processing system (a client device, a probe, the packet analyzer 110, shown and described with reference to FIG. 1, a server system, etc.). The method 500 may include more or fewer operations and the operations may be performed in any order. Performance of the method 500 may enable the data processing system to generate synthetic data packets that each have the same format (e.g., an RFC and/or 3GPP-compliant format) from data packets received from network service providers regardless of the format of the received data packets. The common format can enable or facilitate processing of the synthetic data packets to generate KPIs and/or alerts regarding a network facilitating communication between nodes.

At operation 502, the data processing system receives a first data packet. The first data packet can be or include a control plane signaling data packet. The first data packet can have an SBI format. The data processing system can receive the first data packet from a computing device of a first network service provider that operates nodes (e.g., cell towers) to maintain a communications network. The first data packet can be a copy of a request or a response data packet that a computer transmits to another computer over the network through a node operated or managed by the first network service provider. The data processing system can receive the first data packet with a batch of data packets from the first network service provider or in a sequence of data packets that the first network provider provides to the data processing system.

At operation 504, the data processing system decrypts the first data packet. The data processing system can decrypt the first data packet using a first encryption key (e.g., a public or private encryption key) specific to the first network service provider. The data processing system can decrypt the first data packet by executing a first data adapter that corresponds to the first network service provider. For example, the data processing system can receive the first data packet from the first network service provider in a message. The data processing system can identify an identification of the first network service provider in the message (e.g., identify the source IP address that corresponds to the first network service provider in a names table or another identifier of the first network service provider in the message). The data processing system can retrieve a first data adapter from memory using the identification of the first network service provider as a lookup. The first data adapter can be configured to store or retrieve a first encryption key to decrypt data packets received from the first network service provider. The data processing system can execute the first data adapter and the first data adapter can retrieve the first encryption key and decrypt the first data packet.

At operation 506, the data processing system extracts a first set of data from the first data packet. The first set of data can be or include control plane signaling data of the first data packet. The data processing system can extract the first set of data from the first data packet by executing the first data adapter that the data processing system retrieved from memory. For example, the first data adapter can be configured to read data or otherwise extract or identify data from data packets received from the first network service provider. The data processing system can execute the first data adapter using the first data packet as input. The first data adapter can identify or extract the first set of data from the first data packet based on the execution. In some embodiments, the first set of data extracted from the first data packet can include a fully decrypted TLS layer, an original timestamp of packet arrival at the NF, a fully inflated HTTP/2 HEADERS (HPACK), source and destination NF Instance Identification/Name, a globally unique identifier for transaction matching, a unique identifier for HTTP2 Header/Data fragment reassembly, an inbound or outbound direction of the transaction, an identification of a request or response direction, and/or a 3GPP Interface Type.

At operation 508, the data processing system generates a first synthetic data packet. The data processing system can generate the first synthetic data packet from the first set of data the data processing system extracted from the first data packet. The data processing system can generate the first synthetic data packet by inserting the extracted first set of data into respective Ethernet, IP, TCP, and HTTP2 layers of the first synthetic data packet to which the portions or pieces of the first set of data correspond. In some embodiments, the data processing system can generate the first synthetic data packet using data from multiple data packets received from the first network service provider (e.g., multiple data packets that are a part of the same sequence of data packets or message). The data processing system can generate the first synthetic data packet using data from any number of data packets received from the first network service provider.

At operation 510, the data processing system receives a second data packet. The second data packet can be or include a control plane signaling data packet. The second data packet can have an SBI format. The second data packet can have a different format than the first data packet. The data processing system can receive the second data packet from a computing device of a second network service provider that operates nodes (e.g., cell towers) to maintain a communications network (e.g., the same or a different communications network as the communications network maintained by the first network service provider). The second data packet can be a copy of a request or a response data packet that a computer transmits to another computer over the network through a node operated or managed by the second network service provider. The data processing system can receive the second data packet with a batch of data packets from the second network service provider or in a sequence of data packets that the second network provider provides to the data processing system.

At operation 512, the data processing system decrypts the second data packet. The data processing system can decrypt the second data packet using a second encryption key (e.g., a public or private encryption key) specific to the second network service provider. The data processing system can decrypt the second data packet by executing a second data adapter that corresponds to the second network service provider. For example, the data processing system can receive the second data packet from the second network service provider in a message. The data processing system can identify an identification of the second network service provider in the message (e.g., identify the source IP address that corresponds to the second network service provider in a names table or another identifier of the second network service provider in the message). The data processing system can retrieve a second data adapter from memory using the identification of the second network service provider as a lookup. The second data adapter can be configured to store or retrieve a second encryption key to decrypt data packets received from the second network service provider. The data processing system can execute the second data adapter and the second data adapter can retrieve the second encryption key and decrypt the second data packet.

At operation 514, the data processing system extracts a second set of data from the second data packet. The second set of data can be or include control plane signaling data of the second data packet. The data processing system can extract the second set of data from the second data packet by executing the second data adapter that the data processing system retrieved from memory. For example, the second data adapter can be configured to read data or otherwise extract or identify data from data packets received from the second network service provider. The data processing system can execute the second data adapter using the second data packet as input. The second data adapter can identify or extract the second set of data from the second data packet based on the execution. In some embodiments, the second set of data extracted from the second data packet can include a fully decrypted TLS layer, an original timestamp of packet arrival at the NF, a fully inflated HTTP/2 HEADERS (HPACK), source and destination NF Instance Identification/Name, a globally unique identifier for transaction matching, a unique identifier for HTTP2 Header/Data fragment reassembly, an inbound or outbound direction of the transaction, an identification of a request or response direction, and/or a 3GPP Interface Type.

At operation 516, the data processing system generates a second synthetic data packet. The data processing system can generate the second synthetic data packet from the second set of data the data processing system extracted from the second data packet. The data processing system can generate the second synthetic data packet by inserting the extracted second set of data into respective Ethernet, IP, TCP, and HTTP2 layers of the second synthetic data packet to which the portions or pieces of the second set of data correspond. In some embodiments, the data processing system can generate the second synthetic data packet using data from multiple data packets received from the second network service provider (e.g., multiple data packets that are a part of the same sequence of data packets or message). The data processing system can generate the second synthetic data packet using data from any number of data packets received from the second network service provider.

At operation 518, the data processing system generates KPIs and/or alerts. The data processing system may generate KPIs and/or alerts based on the first synthetic data packet, the second synthetic data packet, and/or data packets received from a probe monitoring communication sessions of the communications network. Based on the data and/or metadata of the synthetic data packets and/or the received data packets, the data processing system can generate KPIs such as a mean opinion score, packet jitter, packet loss, latency, delay, among other metrics of the communication session signals that are transmitted between the two nodes. The data processing system may generate any KPIs. The data processing system may generate alerts such as alerts indicating a security breach. The data processing system may do so by analyzing the QoS data of the communication session for which the data processing system is generating the KPIs and/or alerts. The data processing system may generate values for the KPIs and/or alerts using any method.

Figure 6A:
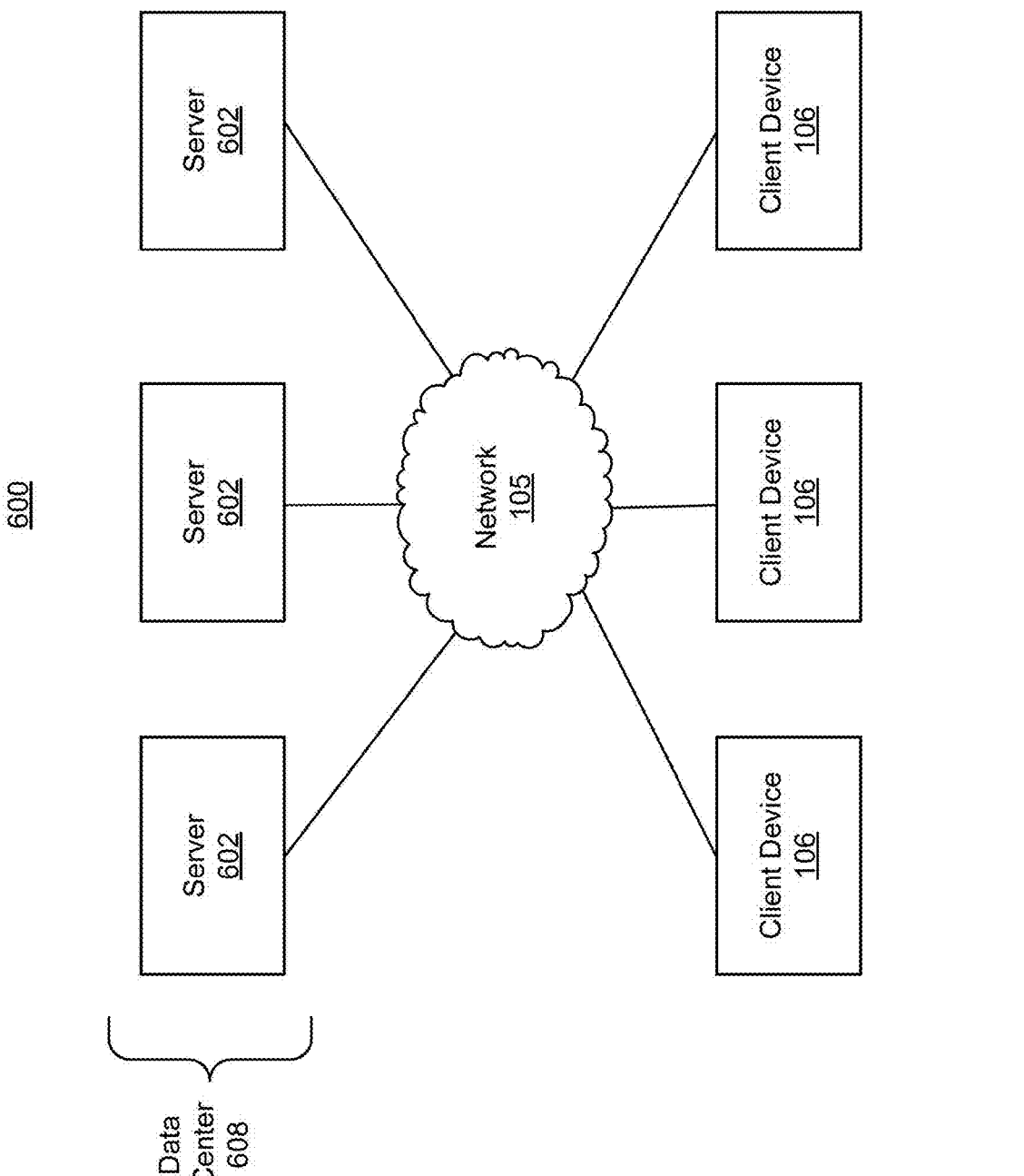
FIG. 6A is a block diagram depicting an implementation of a network environment including a client device in communication with a server device.

FIG. 6A depicts an example network environment that can be used in connection with the methods and systems described herein. In brief overview, the network environment 600 includes one or more client devices 106 (also generally referred to as clients, client node, client machines, client computers, client computing devices, endpoints, or endpoint nodes) in communication with one or more servers 602 (also generally referred to as servers, nodes, or remote machine) via one or more networks 105. In some embodiments, a client 106 has the capacity to function as both a client node seeking access to resources provided by a server and as a server providing access to hosted resources for other client devices 106.

Although FIG. 6A shows a network 105 between the client devices 106 and the servers 602, the client devices 106 and the servers 602 can be on the same network 105. In embodiments, there are multiple networks 105 between the client devices 106 and the servers 602. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g. Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 600 can include multiple, logically grouped servers 602. The logical group of servers can be referred to as a data center 608 (or server farm or machine farm). In embodiments, the servers 602 can be geographically dispersed. The data center 608 can be administered as a single entity or different entities. The data center 608 can include multiple data centers 608 that can be geographically dispersed. The servers 602 within each data center 608 can be homogeneous or heterogeneous (e.g., one or more of the servers 602 or machines 602 can operate according to one type of operating system platform (e.g., WINDOWS NT, manufactured by Microsoft Corp. of Redmond, Washington), while one or more of the other servers 602 can operate on according to another type of operating system platform (e.g., Unix, Linux, or Mac OS X)). The servers 602 of each data center 608 do not need to be physically proximate to another server 602 in the same machine farm 608. Thus, the group of servers 602 logically grouped as a data center 608 can be interconnected using a network. Management of the data center 608 can be de-centralized. For example, one or more servers 602 can comprise components, subsystems and modules to support one or more management services for the data center 608.

Server 602 can be a file server, application server, web server, proxy server, appliance, network appliance, gateway, gateway server, virtualization server, deployment server, SSL VPN server, or firewall. In embodiments, the server 602 can be referred to as a remote machine or a node. Multiple nodes can be in the path between any two communicating servers.

Figure 6B:
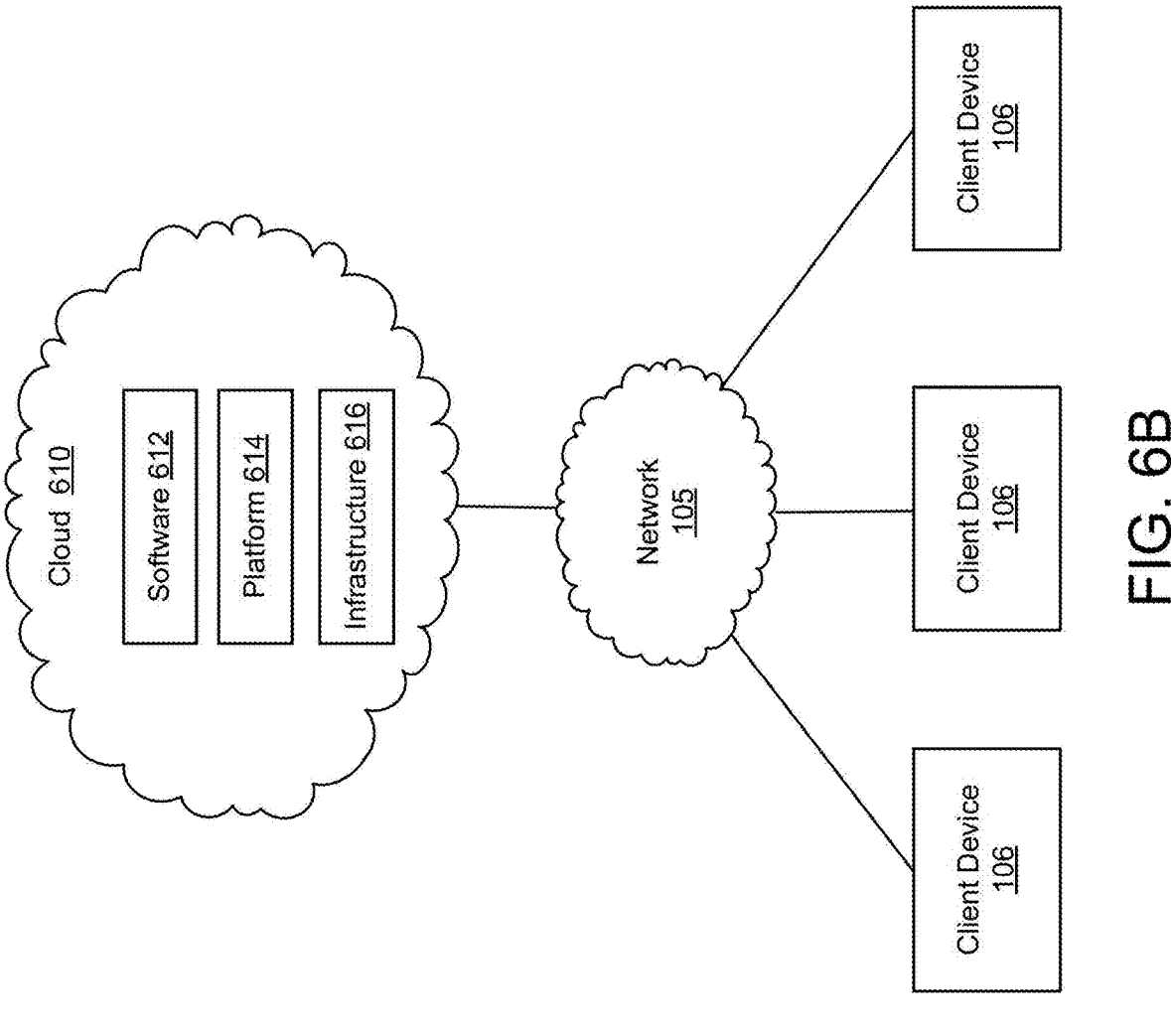
FIG. 6B is a block diagram depicting a cloud computing environment including a client device in communication with cloud service providers.

FIG. 6B illustrates an example cloud computing environment. A cloud computing environment 601 can provide client 106 with one or more resources provided by a network environment. The cloud computing environment 601 can include one or more client devices 106, in communication with the cloud 610 over one or more networks 105. Client devices 106 can include, e.g., thick clients, thin clients, and zero clients. A thick client can provide at least some functionality even when disconnected from the cloud 610 or servers 602. A thin client or a zero client can depend on the connection to the cloud 610 or server 602 to provide functionality. A zero client can depend on the cloud 610 or other networks 105 or servers 602 to retrieve operating system data for the client device. The cloud 610 can include back end platforms, e.g., servers 602, storage, server farms, or data centers.

The cloud 610 can be public, private, or hybrid. Public clouds can include public servers 602 that are maintained by third parties to the client devices 106 or the owners of the clients. The servers 602 can be located off-site in remote geographical locations as disclosed above or otherwise. Public clouds can be connected to the servers 602 over a public network. Private clouds can include private servers 602 that are physically maintained by client devices 106 or owners of clients. Private clouds can be connected to the servers 602 over a private network 105. Hybrid clouds 608 can include both the private and public networks 105 and servers 602.

The cloud 610 can also include a cloud-based delivery, e.g. Software as a Service (SaaS) 612, Platform as a Service (PaaS) 614, and the Infrastructure as a Service (IaaS) 616. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 106 and server 602 can be deployed as and/or executed on any type and form of computing device, e.g. a computer, network device or appliance capable of communicating on any type and form of network and performing the operations described herein.

Figure 6C:
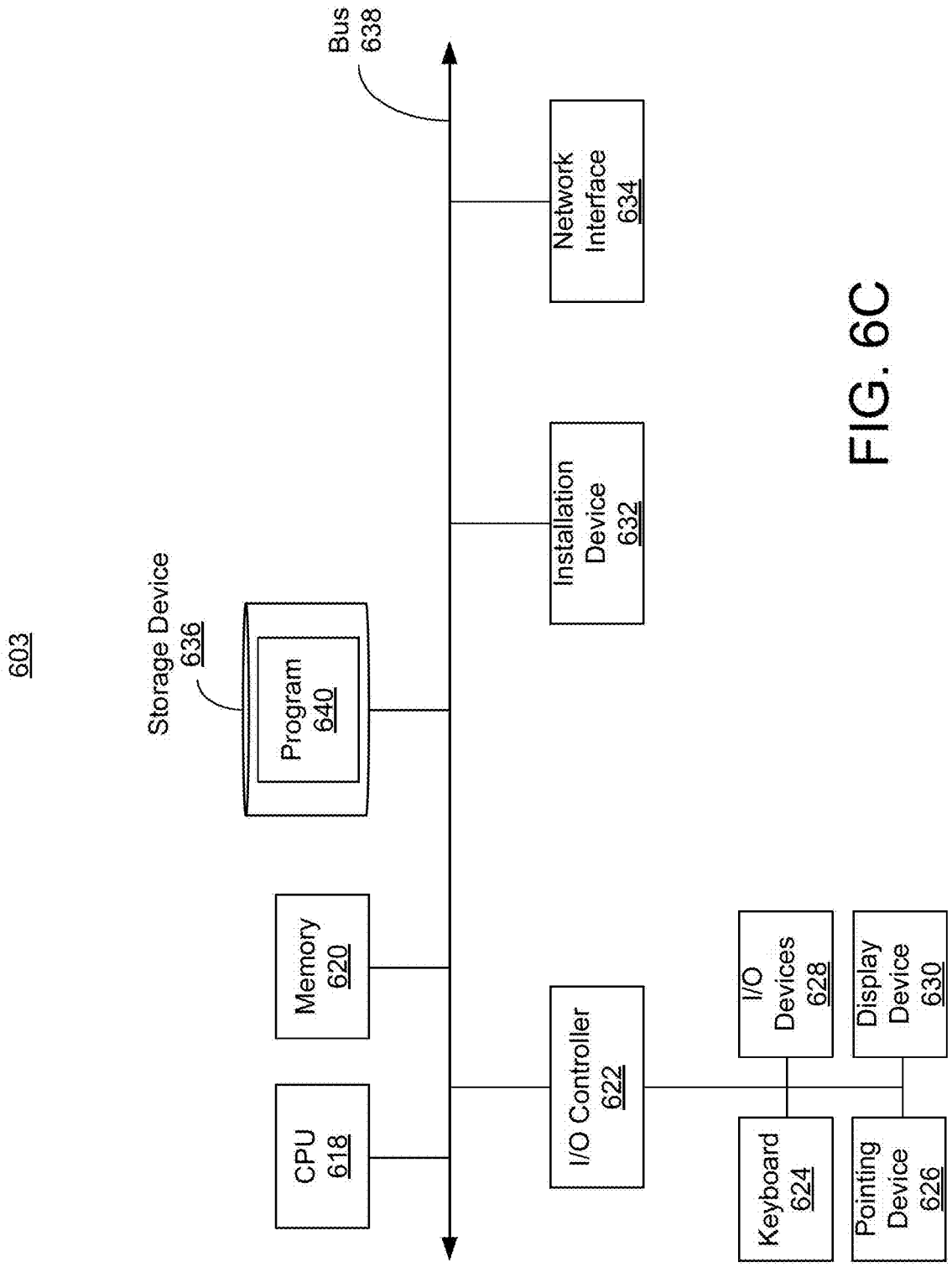
FIG. 6C is a block diagram depicting an implementation of a computing device that can be used in connection with the systems depicted in FIGS. 1, 6A and 6B and the method depicted in FIG. 5.

FIG. 6C depicts block diagrams of a computing device 603 useful for practicing an embodiment of the client 106 or a server 602. As shown in FIG. 6C, each computing device 603 can include a central processing unit 618, and a main memory unit 620. As shown in FIG. 6C, a computing device 603 can include one or more of a storage device 636, an installation device 632, a network interface 634, an I/O controller 622, a display device 630, a keyboard 624 or a pointing device 626, e.g. a mouse. The storage device 636 can include, without limitation, a program 640, such as an operating system, software, or software associated with system 100.

The central processing unit 618 is any logic circuitry that responds to and processes instructions fetched from the main memory unit 620. The central processing unit 618 can be provided by a microprocessor unit, e.g.: those manufactured by Intel Corporation of Mountain View, California. The computing device 603 can be based on any of these processors, or any other processor capable of operating as described herein. The central processing unit 618 can utilize instruction level parallelism, thread level parallelism, different levels of cache, and multi-core processors. A multi-core processor can include two or more processing units on a single computing component.

Main memory unit 620 can include one or more memory chips capable of storing data and allowing any storage location to be directly accessed by the microprocessor 618. Main memory unit 620 can be volatile and faster than storage 636 memory. Main memory units 620 can be Dynamic random access memory (DRAM) or any variants, including static random access memory (SRAM). The memory 620 or the storage 636 can be non-volatile; e.g., non-volatile read access memory (NVRAM). The memory 620 can be based on any type of memory chip, or any other available memory chips. In the example depicted in FIG. 6C, the processor 618 can communicate with memory 620 via a system bus 638.

A wide variety of I/O devices 628 can be present in the computing device 603. Input devices 628 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 628 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 628, display devices 630 or group of devices can be augmented reality devices. The I/O devices can be controlled by an I/O controller 622 as shown in FIG. 6C. The I/O controller 622 can control one or more I/O devices, such as, e.g., a keyboard 624 and a pointing device 626, e.g., a mouse or optical pen. Furthermore, an I/O device can also provide storage and/or an installation device 632 for the computing device 603. In embodiments, the computing device 603 can provide USB connections (not shown) to receive handheld USB storage devices. In embodiments, an I/O device 628 can be a bridge between the system bus 638 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 630 can be connected to I/O controller 622. Display devices can include, e.g., liquid crystal displays (LCD), electronic papers (e-ink) displays, flexile displays, light emitting diode displays (LED), or other types of displays. In some embodiments, display devices 630 or the corresponding I/O controllers 622 can be controlled through or have hardware support for OPENGL or DRECTX API or other graphics libraries. Any of the I/O devices 628 and/or the I/O controller 622 can include any type and/or form of suitable hardware, software, or combination of hardware and software to support, enable or provide for the connection and use of one or more display devices 630 by the computing device 603. For example, the computing device 603 can include any type and/or form of video adapter, video card, driver, and/or library to interface, communicate, connect or otherwise use the display devices 630. In embodiments, a video adapter can include multiple connectors to interface to multiple display devices 630.

The computing device 603 can include a storage device 636 (e.g., one or more hard disk drives or redundant arrays of independent disks) for storing an operating system or other related software, and for storing application software programs 640 such as any program related to the systems, methods, components, modules, elements, or functions depicted in FIG. 1, 2A, 2B, 2C or 2D. Examples of storage device 636 include, e.g., hard disk drive (HDD); optical drive including CD drive, DVD drive, or BLU-RAY drive; solid-state drive (SSD); USB flash drive; or any other device suitable for storing data. Storage devices 636 can include multiple volatile and non-volatile memories, including, e.g., solid state hybrid drives that combine hard disks with solid state cache. Storage devices 636 can be non-volatile, mutable, or read-only. Storage devices 636 can be internal and connect to the computing device 603 via a bus 638. Storage device 636 can be external and connect to the computing device 603 via an I/O device 630 that provides an external bus. Storage device 636 can connect to the computing device 603 via the network interface 634 over a network 105. Some client devices 106 may not require a non-volatile storage device 636 and can be thin clients or zero client devices 106. Some storage devices 636 can be used as an installation device 632 and can be suitable for installing software and programs.

The computing device 603 can include a network interface 634 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 603 can communicate with other computing devices

603 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 634 can include a built-in network adapter, network interface card, PCMCIA network card, EXPRESSCARD network card, card bus network adapter, wireless network adapter, USB network adapter, modem or any other device suitable for interfacing the computing device 603 to any type of network capable of communication and performing the operations described herein.

A computing device 603 of the sort depicted in FIG. 6C can operate under the control of an operating system, which controls scheduling of tasks and access to system resources. The computing device 603 can be running any operating system configured for any type of computing device, including, for example, a desktop operating system, a mobile device operating system, a tablet operating system, or a smartphone operating system.

The computing device 603 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 603 has sufficient processor power and memory capacity to perform the operations described herein. In some embodiments, the computing device 603 can have different processors, operating systems, and input devices consistent with the device.

In embodiments, the status of one or more machines 106, 602 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 603 in response to the CPU 618 executing an arrangement of instructions contained in main memory 620. Such instructions can be read into main memory 620 from another computer-readable medium, such as the storage device 636. Execution of the arrangement of instructions contained in main memory 620 causes the computing device 603 to perform the illustrative processes described herein. One or more processors in a multi-processing arrangement may also be employed to execute the instructions contained in main memory 620. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

At least one aspect of a technical solution to the aforementioned problem is directed to a method. The method may comprise receiving, by a processor from a first computing device, a first data packet comprising a first set of control plane signaling data, the first set of control plane signaling data organized in a first format within the first data packet; extracting, by the processor using a first data adapter corresponding to the first computing device, the first set of control plane signaling data from the first data packet; generating, by the processor using a uniform data adapter, a first synthetic data packet from the first set of control plane signaling data extracted by the first data adapter, the first set of control plane signaling data organized in a uniform format within the first synthetic data packet; receiving, by the processor from a second computing device, a second data packet comprising a second set of control plane signaling data, the second set of control plane signaling data organized in a second format within the second data packet, the second format different from the first format; extracting, by the processor using a second data adapter corresponding to the second computing device, the second set of control plane signaling data from the second data packet; generating, by the processor using the uniform data adapter, a second synthetic data packet from the second set of control plane signaling data extracted by the second data adapter, the second set of control plane signaling data organized in the uniform format within the second synthetic data packet, the uniform format different than the first format and the second format; and generating, by the processor, a key performance indicator (KPI) based on data from the first synthetic data packet and the second synthetic data packet according to a service configured to generate KPIs from data packets having data organized in the uniform format.

At least one aspect of this technical solution is directed to a system. The system may comprise one or more processors. The one or more processors may be coupled to a memory. The one or more processors may receive, from a first computing device, a first data packet comprising a first set of control plane signaling data, the first set of control plane signaling data organized in a first format within the first data packet; extract, using a first data adapter corresponding to the first computing device, the first set of control plane signaling data from the first data packet; generate, using a uniform data adapter, a first synthetic data packet from the first set of control plane signaling data extracted by the first data adapter, the first set of control plane signaling data organized in a uniform format within the first synthetic data packet; receive, from a second computing device, a second data packet comprising a second set of control plane signaling data, the second set of control plane signaling data organized in a second format within the second data packet, the second format different from the first format; extract, using a second data adapter corresponding to the second computing device, the second set of control plane signaling data from the second data packet; generate, using the uniform data adapter, a second synthetic data packet from the second set of control plane signaling data extracted by the second data adapter, the second set of control plane signaling data organized in the uniform format within the second synthetic data packet, the uniform format different that the first format and the second format; and generate a key performance indicator (KPI) based on data from the first synthetic data packet and the second synthetic data packet according to a service configured to generate KPIs from data packets having data organized in the uniform format.

At least one aspect of this technical solution is directed to a non-transitory computer-readable storage medium storing executable instructions that, when executed by one or more processors, cause the one or more processors to receive, from a first computing device, a first data packet comprising a first set of control plane signaling data, the first set of control plane signaling data organized in a first format within the first data packet; extract, using a first data adapter corresponding to the first computing device, the first set of control plane signaling data from the first data packet; generate, using a uniform data adapter, a first synthetic data packet from the first set of control plane signaling data extracted by the first data adapter, the first set of control plane signaling data organized in a uniform format within the first synthetic data packet; receive, from a second computing device, a second data packet comprising a second set of control plane signaling data, the second set of control plane signaling data organized in a second format within the second data packet, the second format different from the first format; extract, using a second data adapter corresponding to the second computing device, the second set of control plane signaling data from the second data packet; generate, using the uniform data adapter, a second synthetic data packet from the second set of control plane signaling data extracted by the second data adapter, the second set of control plane signaling data organized in the uniform format within the second synthetic data packet, the uniform format different that the first format and the second format; and generate a key performance indicator (KPI) based on data from the first synthetic data packet and the second synthetic data packet according to a service configured to generate KPIs from data packets having data organized in the uniform format.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the probe 104 or the packet analyzer 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:

receiving, by a processor from a first computing device, a first data packet comprising a first set of control plane signaling data, the first set of control plane signaling data organized in a first format within the first data packet;

extracting, by the processor using a first data adapter corresponding to the first computing device, the first set of control plane signaling data from the first data packet;

generating, by the processor using a uniform data adapter, a first synthetic data packet from the first set of control plane signaling data extracted by the first data adapter, wherein the first synthetic data packet comprises a Request for Comments (RFC) or 3rd Generation Partnership Project (3GPP) compliant data packet comprising an Ethernet layer, an Internet Protocol (IP) layer, a transmission control protocol (TCP) layer, a payload, and a header, and wherein generating the first synthetic data packet comprises inserting data from the first set of control plane signaling data into the Ethernet layer, the IP layer, the TCP layer, the payload, and the header of the first synthetic data packet, the first set of control plane signaling data organized in a uniform format within the first synthetic data packet;

receiving, by the processor from a second computing device, a second data packet comprising a second set of control plane signaling data, the second set of control plane signaling data organized in a second format within the second data packet, the second format different from the first format;

extracting, by the processor using a second data adapter corresponding to the second computing device, the second set of control plane signaling data from the second data packet;

generating, by the processor using the uniform data adapter, a second synthetic data packet from the second set of control plane signaling data extracted by the second data adapter, wherein the second synthetic data packet comprises an RFC or 3GPP compliant data packet comprising an Ethernet layer, an IP layer, a TCP layer, a payload, and a header, and wherein generating the second synthetic data packet comprises inserting data from the second set of control plane signaling data into the Ethernet layer, the IP layer, the TCP layer, the payload, and the header of the second synthetic data packet, the second set of control plane signaling data organized in the uniform format within the second synthetic data packet, the uniform format different than the first format and the second format; and generating, by the processor, a key performance indicator (KPI) based on data from the first synthetic data packet and the second synthetic data packet according to a service configured to generate KPIs from data packets having data organized in the uniform format.

2. The method of claim 1, comprising:

receiving, by the processor, a plurality of data packets from the first computing device, the plurality of data packets comprising the first data packet; and extracting, by the processor using the first data adapter corresponding to the first computing device, a set of control plane signaling data from each of the plurality of data packets, wherein generating the first synthetic data packet comprises inserting, by the processor, data from each of the set of control plane signaling data into the first synthetic data packet.

3. The method of claim 1, further comprising:

receiving, by the processor from the first computing device, a set of data packets and an identification of a sequence of data packets, the sequence of data packets comprising a subset of the set of data packets including the first data packet; and extracting, by the processor using the first data adapter corresponding to the first computing device, a set of control plane signaling data from each of the sequence of data packets, wherein generating the first synthetic data packet comprises inserting, by the processor, data from each of the set of control plane signaling data into the first synthetic data packet.

4. The method of claim 1, further comprising:

receiving, by the processor from the first computing device, an identification of the first computing device and a plurality of data packets including the first data packet;

retrieving, by the processor, a defined number from a database based on the identification of the first computing device; and extracting, by the processor using the first data adapter corresponding to the first computing device, a set of control plane signaling data from each of the plurality of data packets, wherein generating the first synthetic data packet comprises inserting, by the processor, data from the defined number of the set of control plane signaling data into the first synthetic data packet.

5. The method of claim 1, further comprising:

receiving, by the processor, a sequence number of the first data packet; and inserting, by the processor, the sequence number into the first synthetic data packet.

6. The method of claim 1, wherein extracting the first set of control plane signaling data from the first data packet comprises decrypting, by the processor using the first data adapter, the first data packet with a first encryption key; and wherein extracting the second set of control plane signaling data from the second data packet comprises decrypting, by the processor using the second data adapter, the second data packet with a second encryption key.

7. The method of claim 1, further comprising:

collecting, by the processor via a probe from a communication channel between a first node and a second node, a plurality of control plane signaling data packets, each control plane signaling data packet of the plurality comprising a timestamp indicating a time of transmission or receipt of the control plane signaling data packet; and storing, by the processor, data from the plurality of control plane signaling data packets in a database, wherein generating the KPI comprises generating, by the processor, the KPI based on data, including one or more timestamps, from the first synthetic data packet, the second synthetic data packet, and at least a portion of the data from the plurality of control plane signaling data packets in the database.

8. The method of claim 1, wherein receiving the first data packet comprises receiving, by the processor, a request data packet or a response data packet of a communication transaction, the request data packet or the response data packet comprising a global unique identifier for matching the request data packet to a corresponding response data packet or matching the response data packet to a corresponding request data packet.

9. The method of claim 8, wherein generating the first synthetic data packet comprises inserting, by the processor, an identification as to whether the first data packet is a request data packet or a response data packet into a hypertext transfer protocol/2 (HTTP/2 protocol) layer of the first synthetic data packet and an identification of a source node and an identification of a destination node into an Internet Protocol (IP) layer of the first synthetic data packet.

10. The method of claim 1, further comprising:

responsive to receiving the first data packet, retrieving, by the processor, the first data adapter based on an identification of the first computing device, wherein extracting the first set of control plane signaling data from the first data packet using the first data adapter comprises extracting, by the processor, the first data packet using the first data adapter in response to the retrieving the first data adapter.

11. A system, comprising:

one or more processors, coupled to memory, to:

receive, from a first computing device, a first data packet comprising a first set of control plane signaling data, the first set of control plane signaling data organized in a first format within the first data packet;

extract, using a first data adapter corresponding to the first computing device, the first set of control plane signaling data from the first data packet;

generate, using a uniform data adapter, a first synthetic data packet from the first set of control plane signaling data extracted by the first data adapter, wherein the first synthetic data packet comprises a Request for Comments (RFC) or 3rd Generation Partnership Project (3GPP) compliant data packet comprising an Ethernet layer, an Internet Protocol (IP) layer, a transmission control protocol (TCP) layer, a payload, and a header, and wherein the one or more processors generate the first synthetic data packet by inserting data from the first set of control plane signaling data into the Ethernet layer, the IP layer, the TCP layer, the payload, and the header of the first synthetic data packet, the first set of control plane signaling data organized in a uniform format within the first synthetic data packet;

receive, from a second computing device, a second data packet comprising a second set of control plane signaling data, the second set of control plane signaling data organized in a second format within the second data packet, the second format different from the first format;

extract, using a second data adapter corresponding to the second computing device, the second set of control plane signaling data from the second data packet;

generate, using the uniform data adapter, a second synthetic data packet from the second set of control plane signaling data extracted by the second data adapter, wherein the second synthetic data packet comprises an RFC or 3GPP compliant data packet comprising an Ethernet layer, an IP layer, a TCP layer, a payload, and a header, and wherein the one or more processors generate the second synthetic data packet by inserting data from the second set of control plane signaling data into the Ethernet layer, the IP layer, the TCP layer, the payload, and the header of the second synthetic data packet, the second set of control plane signaling data organized in the uniform format within the second synthetic data packet, the uniform format different that the first format and the second format; and generate a key performance indicator (KPI) based on data from the first synthetic data packet and the second synthetic data packet according to a service configured to generate KPIs from data packets having data organized in the uniform format.

12. The system of claim 11, wherein the one or more processors:

receive a plurality of data packets from the first computing device, the plurality of data packets comprising the first data packet; and extract, using the first data adapter corresponding to the first computing device, a set of control plane signaling data from each of the plurality of data packets, wherein the one or more processors generate the first synthetic data packet by inserting data from each of the set of control plane signaling data into the first synthetic data packet.

13. The system of claim 11, wherein the one or more processors:

receive, from the first computing device, a set of data packets and an identification of a sequence of data packets, the sequence of data packets comprising a subset of the set of data packets including the first data packet; and extract, using the first data adapter corresponding to the first computing device, a set of control plane signaling data from each of the sequence of data packets, wherein the one or more processors generate the first synthetic data packet by inserting data from each of the set of control plane signaling data into the first synthetic data packet.

14. The system of claim 11, wherein the one or more processors:

receive, from the first computing device, an identification of the first computing device and a plurality of data packets including the first data packet;

retrieve a defined number from a database based on the identification of the first computing device; and extract, using the first data adapter corresponding to the first computing device, a set of control plane signaling data from each of the plurality of data packets, wherein the one or more processors generate the first synthetic data packet by inserting data from the defined number of the set of control plane signaling data into the first synthetic data packet.

15. The system of claim 11, wherein the one or more processors:

receive a sequence number of the first data packet; and insert the sequence number into the first synthetic data packet.

16. The system of claim 11, wherein the one or more processors extract the first set of control plane signaling data from the first data packet by decrypting, using the first data adapter, the first data packet with a first encryption key; and wherein the one or more processors extract the second set of control plane signaling data from the second data packet by decrypting, using the second data adapter, the second data packet with a second encryption key.

17. A non-transitory computer-readable storage medium storing executable instructions that, when executed by one or more processors, cause the one or more processors to:

receive, from a first computing device, a first data packet comprising a first set of control plane signaling data, the first set of control plane signaling data organized in a first format within the first data packet;

extract, using a first data adapter corresponding to the first computing device, the first set of control plane signaling data from the first data packet;

generate, using a uniform data adapter, a first synthetic data packet from the first set of control plane signaling data extracted by the first data adapter, wherein the first synthetic data packet comprises a Request for Comments (RFC) or 3rd Generation Partnership Project (3GPP) compliant data packet comprising an Ethernet layer, an Internet Protocol (IP) layer, a transmission control protocol (TCP) layer, a payload, and a header, and wherein the instructions cause the one or more processors to generate the first synthetic data packet by inserting data from the first set of control plane signaling data into the Ethernet layer, the IP layer, the TCP layer, the payload, and the header of the first synthetic data packet, the first set of control plane signaling data organized in a uniform format within the first synthetic data packet;

receive, from a second computing device, a second data packet comprising a second set of control plane signaling data, the second set of control plane signaling data organized in a second format within the second data packet, the second format different from the first format;

extract, using a second data adapter corresponding to the second computing device, the second set of control plane signaling data from the second data packet;

generate, using the uniform data adapter, a second synthetic data packet from the second set of control plane signaling data extracted by the second data adapter, wherein the second synthetic data packet comprises an RFC or 3GPP compliant data packet comprising an Ethernet layer, an IP layer, a TCP layer, a payload, and a header, and wherein the instructions cause the one or more processors to generate the second synthetic data packet by inserting data from the second set of control plane signaling data into the Ethernet layer, the IP layer, the TCP layer, the payload, and the header of the second synthetic data packet, the second set of control plane signaling data organized in the uniform format within the second synthetic data packet, the uniform format different that the first format and the second format; and generate a key performance indicator (KPI) based on data from the first synthetic data packet and the second synthetic data packet according to a service configured to generate KPIs from data packets having data organized in the uniform format.

18. The non-transitory computer-readable storage medium of claim 17, wherein the instructions cause the one or more processors to:

receive a plurality of data packets from the first computing device, the plurality of data packets comprising the first data packet; and extract, using the first data adapter corresponding to the first computing device, a set of control plane signaling data from each of the plurality of data packets, wherein the one or more processors generate the first synthetic data packet by inserting data from each of the set of control plane signaling data into the first synthetic data packet.

* * * * *